United States Patent
Sue et al.

(10) Patent No.: US 9,652,340 B2
(45) Date of Patent: May 16, 2017

(54) COMPUTER SWITCHING METHOD, COMPUTER SYSTEM, AND MANAGEMENT COMPUTER

(71) Applicant: Hitachi, Ltd., Tokyo (JP)

(72) Inventors: Hirohito Sue, Tokyo (JP); Shingo Katano, Tokyo (JP); Masayoshi Kitamura, Tokyo (JP); Yoshifumi Takamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 163 days.

(21) Appl. No.: 14/427,171

(22) PCT Filed: Mar. 15, 2013

(86) PCT No.: PCT/JP2013/057357
§ 371 (c)(1),
(2) Date: Mar. 10, 2015

(87) PCT Pub. No.: WO2014/141462
PCT Pub. Date: Sep. 18, 2014

(65) Prior Publication Data
US 2015/0242290 A1    Aug. 27, 2015

(51) Int. Cl.
*G06F 11/00*     (2006.01)
*G06F 11/20*     (2006.01)
(Continued)

(52) U.S. Cl.
CPC ............ *G06F 11/203* (2013.01); *G06F 3/067* (2013.01); *G06F 3/0614* (2013.01);
(Continued)

(58) Field of Classification Search
CPC ............ G06F 11/203; G06F 11/0709; G06F 11/0727; G06F 11/201; G06F 3/0614;
(Continued)

(56) References Cited

U.S. PATENT DOCUMENTS 6,775,230 B1 * 8/2004 Watanabe ............ H04L 49/357
                                                    370/218
7,565,568 B1 * 7/2009 Kumar ................. G06F 11/201
                                                    714/11

(Continued)

FOREIGN PATENT DOCUMENTS

| JP | 2006-163963 A | 6/2006 |
| JP | 2007-164305 A | 6/2007 |
| JP | 2011-60306 A  | 3/2011 |

*Primary Examiner* — Joseph D Manoskey
(74) *Attorney, Agent, or Firm* — Mattingly & Malur, PC

(57) ABSTRACT

A computer switching method to be performed by a computer system including a plurality of computers, a storage system, and a management computer, the plurality of computers including: a plurality of first computers and a plurality of second computers, the storage system providing a logical storage device to each of the plurality of first computers, the logical storage device including a first logical storage device which is a storage area for storing data, the computer switching method including: a step of transmitting, by the management computer, a generation request for instructing the storage system to generate a second logical storage device; a step of generating, by the management computer, change information for mapping the first logical storage device to the second logical storage device for the second computer, and transmitting a change request including the generated change information to the storage system.

12 Claims, 26 Drawing Sheets

(51) Int. Cl.
 *G06F 11/07* (2006.01)
 *G06F 3/06* (2006.01)
 *G06F 9/44* (2006.01)

(52) U.S. Cl.
 CPC .......... *G06F 3/0635* (2013.01); *G06F 3/0665* (2013.01); *G06F 9/4416* (2013.01); *G06F 11/0727* (2013.01)

(58) Field of Classification Search
 CPC ...... G06F 3/0635; G06F 3/0665; G06F 3/067; G06F 9/4416
 USPC ............ 714/4.11, 4.2, 6.21, 6.32, 10, 11, 13
 See application file for complete search history.

(56) References Cited

U.S. PATENT DOCUMENTS

| | | | | |
|---|---|---|---|---|
| 8,082,411 B1* | 12/2011 | Seetharam | ............ | G06F 3/0617 709/225 |
| 8,918,392 B1* | 12/2014 | Brooker | ............ | G06F 17/30159 370/355 |
| 2006/0090048 A1* | 4/2006 | Okumoto | .............. | G06F 3/0605 711/162 |
| 2006/0143498 A1 | 6/2006 | Hatasaki et al. | | |
| 2007/0136447 A1 | 6/2007 | Nakajima et al. | | |
| 2008/0313641 A1* | 12/2008 | Inoue | ...................... | G06F 3/061 718/104 |
| 2009/0043999 A1 | 2/2009 | Hatasaki et al. | | |
| 2012/0144116 A1* | 6/2012 | Kato | .................... | G06F 3/0608 711/117 |
| 2014/0156960 A1* | 6/2014 | Simoncelli | ............ | G06F 21/604 711/163 |

\* cited by examiner

SERVER MANAGEMENT TABLE

| SERVER ID (501) | CPU INFORMATION (502) | | MEMORY INFORMATION (503) | I/O DEVICE INFORMATION (504) | | STATUS (505) |
|---|---|---|---|---|---|---|
| | NUMBER OF CPUs (506) | FREQUENCY (507) | | NIC (508) | HBA (509) | |
| S1 | 2 | 2GHz | 2GB | MAC1 | WWN1 | ACTIVE |
| | | | | MAC2 | WWM2 | |
| S2 | 4 | 2GHz | 16GB | MAC3 | WWN3 | ACTIVE |
| | | | | MAC4 | WWN4 | |
| | | | | MAC5 | WWN5 | |
| | | | | MAC6 | WWN6 | |
| S3 | 2 | 4GHz | 4GB | MAC7 | WWN7 | STANDBY |
| ⋮ | ⋮ | ⋮ | ⋮ | ⋮ | ⋮ | ⋮ |

Fig. 5

PATH MANAGEMENT TABLE

| SERVER ID (601) | HBA (602) | STORAGE APPARATUS ID (603) | PORT NUMBER (604) | HOST GROUP ID (605) | DEVICE ID (606) |
|---|---|---|---|---|---|
| S1 | WWN1 | SD1 | P1 | HG1 | LU1 |
| | WWN2 | | P1 | HG2 | LU2 |
| S2 | WWN3 | SD1 | P2 | HG3 | LU10 |
| | WWN4 | | P2 | HG4 | LU20 |
| | WWN5 | | P2 | HG5 | LU30 |
| | WWN6 | | P2 | HG6 | LU40 |
| S3 | WWN7 | SD1 | P3 | - | - |
| ⋮ | ⋮ | ⋮ | ⋮ | ⋮ | ⋮ |

Fig. 6

STORAGE DEVICE MANAGEMENT TABLE

| STORAGE APPARATUS ID | DEVICE ID | CAPACITY | TYPE |
|---|---|---|---|
| SD1 | LU 1 | 2GB | PHYSICAL |
| | LU 2 | 4GB | PHYSICAL |
| | LU 3 | 4GB | PHYSICAL |
| | LU 4 | 2GB | PHYSICAL |
| | LU 5 | 10GB | PHYSICAL |
| | LU 6 | 2GB | PHYSICAL |
| | LU 10 | 4GB | VIRTUAL |
| | LU 20 | 4GB | VIRTUAL |
| | LU 30 | 2GB | VIRTUAL |
| | LU 40 | 10GB | VIRTUAL |

*Fig. 7*

VIRTUAL LU MAPPING TABLE

| PHYSICAL DEVICE ID | VIRTUAL DEVICE ID |
|---|---|
| LU3 | LU10 |
| LU4 | LU20 |
| LU5 | LU30 |
| LU6 | LU40 |

*Fig. 8*

COLD STANDBY GROUP TABLE

| COLD STANDBY GROUP ID | ACTIVE SERVER ID | STANDBY SERVER ID |
|---|---|---|
| CG1 | S1 | S2 |
| CG2 | S3 | S5 |
| | S4 | |
| CG3 | S6 | S7 |

*Fig. 16*

COMPUTER SWITCHING METHOD, COMPUTER SYSTEM, AND MANAGEMENT COMPUTER

BACKGROUND OF THE INVENTION

This invention relates to a switching technology for a computer for executing a service in a computer system including a plurality of computers.

In a computer system, there is known a booting method in which a server starts a service by using information stored in an external storage apparatus coupled to the server. Such a computer system is configured so that an active server for executing a service and a standby server for taking over the service are set in advance in order to handle a failure.

In a case where a failure occurs in the active server in such a configuration as described above, a management server or the like sets a world wide name (WWN) assigned to an HBA of the active server for an HBA of the standby server as disclosed in, for example, Japanese Patent Application Laid-open No. 2007-164305. In this manner, it is possible to switch from the active server to the standby server.

SUMMARY OF THE INVENTION

A plurality of servers are coupled to the storage apparatus, and hence the storage apparatus manages the WWN assigned to an HBA of each of the servers and a boot disk in association with each other. This allows the server to appropriately manage an accessible storage area. More specifically, the storage apparatus manages the active server and the standby server as one host group, and associates the boot disk with each host group.

However, in the technology disclosed in Japanese Patent Application Laid-open No. 2007-164305, it is necessary to set the host group for each port of the storage apparatus, and hence the active server and the standby server need to be coupled to the same port. Therefore, a server coupled to a port different from a port to which the active server is coupled cannot be set as the standby server. This raises a problem in that I/O load increases due to a large number of servers coupled to one port.

On the other hand, in a case where the server coupled to the port different from the port to which the active server is coupled is set as the standby server, an administrator needs to provide the standby server with settings on which path information or the like on a plurality of active servers is reflected.

However, in the computer system having an extremely large number of active servers, it takes time and labor to grasp configurations of the individual active servers, and hence it is hard to perform the above-mentioned settings.

An object of this invention is to provide: a computer system capable of automatically setting a server coupled to a port different from a port to which an active server is coupled as a standby server and switching from the active server to the standby server; a method therefor; and an apparatus therefor.

The present invention can be appreciated by the description which follows in conjunction with the following figures, wherein: a computer switching method to be performed by a computer system including a plurality of computers, a storage system, and a management computer. The plurality of computers each includes: a first processor; a first memory coupled to the first processor; and a first I/O device coupled to the first processor. The management computer includes: a second processor; a second memory coupled to the second processor; and a second I/O device coupled to the second processor. The storage system includes: a controller; a plurality of storage devices coupled to the controller; and a plurality of ports coupled to the controller, for respectively coupling the storage system to the plurality of computers. The plurality of computers includes: a plurality of first computers for executing a service; and a plurality of second computers for taking over the service executed by each of the plurality of first computers. The storage system provides a logical storage device generated by using storage areas of the plurality of storage devices to each of the plurality of first computers. The logical storage device includes a first logical storage device which is a storage area for storing data necessary for the service. The computer switching method includes: a first step of detecting, by the management computer, a switch trigger for the service from one of the plurality of first computers to one of the plurality of second computers; a second step of transmitting, by the management computer, a first generation request for instructing the storage system to generate a second logical storage device which is a virtualized storage area to be provided to the one of the plurality of second computers; a third step of generating, by the storage system, the second logical storage device for the one of the plurality of second computers based on the first generation request; a fourth step of generating, by the management computer, first change information for mapping the first logical storage device for storing the data necessary for the service executed by the one of the plurality of first computers to the second logical storage device for the one of the plurality of second computers, and transmitting a first change request including the generated first change information to the storage system; a fifth step of mapping, by the storage system, the first logical storage device for storing the data necessary for the service executed by the one of the plurality of first computers to the second logical storage device for the one of the plurality of second computers based on the first change information; and a sixth step of booting, by the management computer, the one of the plurality of second computers.

According to one embodiment of this invention, it is possible to automatically select a computer coupled to a port different from a port to which a first computer (active server) is coupled as a second computer (standby server) and perform settings that allow the second computer to access a first logical storage device. Accordingly, it is possible to switch from the first computer to the second computer.

Objects, configurations, and effects other than those described above become apparent from the following descriptions of embodiments of this invention.

BRIEF DESCRIPTION OF THE DRAWINGS

The present invention can be appreciated by the description which follows in conjunction with the following figures, wherein:

FIG. 5 is an explanatory diagram showing an example of a server management table according to the first embodiment of this invention;

FIG. 6 is an explanatory diagram showing an example of a path management table according to the first embodiment of this invention;

FIG. 7 is an explanatory diagram showing an example of a storage device management table according to the first embodiment of this invention;

FIG. 8 is an explanatory diagram showing an example of a virtual LU mapping table according to the first embodiment of this invention;

FIG. 16 is an explanatory diagram illustrating an example of a cold standby group table according to the second embodiment of this invention;

DETAILED DESCRIPTION OF THE PREFERRED EMBODIMENTS

Now, a description is given of embodiments of this invention with reference to the accompanying drawings.

<First Embodiment>

Figure 1:
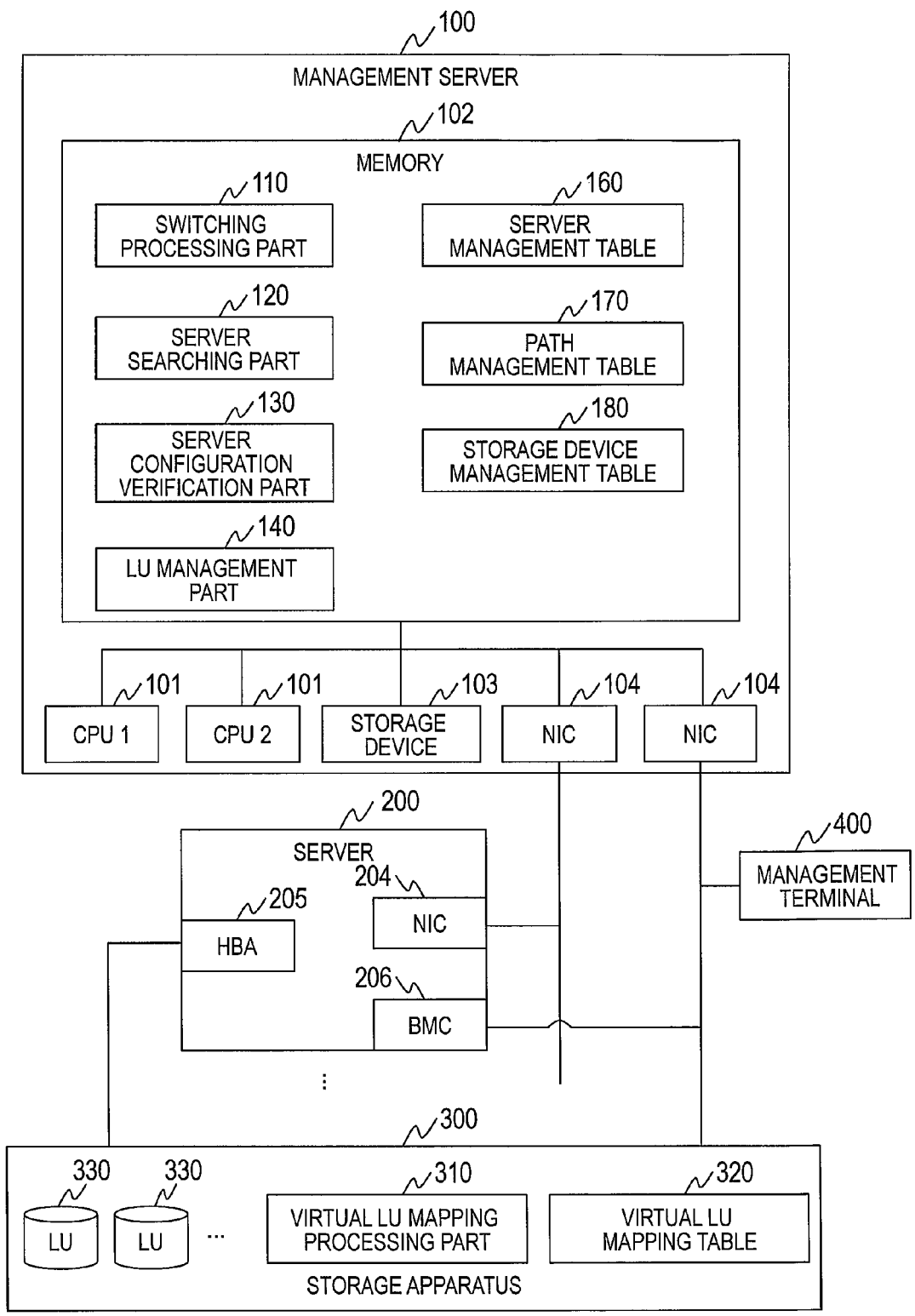
FIG. 1 is a block diagram illustrating a configuration of a computer system according to a first embodiment of this invention.

FIG. 1 is a block diagram illustrating a configuration of a computer system according to a first embodiment of this invention.

The computer system according to the first embodiment includes a management server 100, a plurality of servers 200, a storage apparatus 300, and a management terminal 400.

The management server 100 is coupled to the plurality of servers 200, the storage apparatus 300, and the management terminal 400 through a network. A wide area network (WAN) or a local area network (LAN) is conceivable as the network. It should be noted that this invention is not limited to a specific coupling format of the network.

Further, a plurality of servers 200 are coupled to the storage apparatus 300 through a network. A storage area network (SAN) is conceivable as the network. It should be noted that this invention is not limited to a specific coupling format of the network.

The servers 200 are each a computer for executing a service. In this embodiment, the servers 200 include an active server 200 and a standby server 200. The active server 200 is a server for executing a service, and the standby server 200 is a server for taking over the service, in a case where a failure occurs in the active server 200. Further, in this embodiment, the servers 200 also include a server 200 that is not set as the standby server 200. In the following description, the server 200 that is not set as the standby server 200 is referred to also as "candidate server 200".

The active server 200 executes a predetermined service by using a logical unit (LU) 330 provided by the storage apparatus 300.

Hardware and software configurations of the server 200 are described later with reference to FIG. 2. It should be noted that the active server 200 and the standby server 200 have the same hardware configuration.

The storage apparatus 300 provides the active server 200 with a storage area. In this embodiment, the storage apparatus 300 generates a plurality of LUs 330 by using a plurality of storage devices 304 illustrated in FIG. 3, and provides each LU 330 to the active server 200. Hardware and software configurations of the storage apparatus 300 are described later with reference to FIG. 3.

It should be noted that, although FIG. 1 illustrates one storage apparatus 300, the number of storage apparatus 300 may be at least two.

The management terminal 400 is a computer used by an administrator or the like of the computer system to perform various settings. The management terminal 400 includes a CPU, a memory, and a network interface card (NIC) (not shown). Further, the management terminal 400 includes an input device such as a keyboard and a mouse and an output device such as a display.

Here, a description is made of hardware and software configurations of the management server 100.

The management server 100 includes a plurality of CPUs 101, a memory 102, a storage device 103, and a plurality of NICs 104. It should be noted that the management server 100 may include an input device such as a keyboard and a mouse and an output device such as a display.

The CPU 101 includes at least one CPU core, and executes a program stored in the memory 102. A function provided to the management server 100 can be implemented by the CPU 101 executing the program. In the following, when a description is given with the use of a program as a subject, such description indicates that the program is executed by the CPU 101.

The memory 102 stores the program executed by the CPU 101 and information necessary to execute the program. The program and information stored in the memory 102 are described later.

The storage device 103 stores various kinds of data managed by the management server 100. As the storage device 103, for example, an HDD and an SSD are conceivable. It should be noted that the program and the information stored in the memory 102 may be stored in the storage device 103. In this case, the CPU 101 loads the program and the information from the storage device 103 onto the memory 102, and executes predetermined processing by using the program and the information that have been loaded.

The NIC 104 is an interface for communicating to/from another apparatus through the network. In this embodiment, the management server 100 includes a NIC 104 for coupling to a network for management and a NIC 104 for coupling to a network for a service.

Next, a description is made of the program and information stored in the memory 102.

The memory 102 stores programs for implementing a switching processing part 110, a server searching part 120, a server configuration verification part 130, and an LU management part 140. Further, the memory 102 stores a server management table 160, a path management table 170, and a storage device management table 180.

The switching processing part 110 supervises switching processing from the active server 200 to the standby server 200. In the first embodiment of this invention, the switching processing part 110 supervises failover processing executed in a case where a failure occurs in the active server 200.

The server searching part 120 searches for the standby server 200 for taking over the service executed by the active server 200. The server configuration verification part 130 generates information necessary to generate a virtual LU 332 illustrated in FIG. 4 based on the configurations of the active server 200 and the standby server 200.

Figure 4:
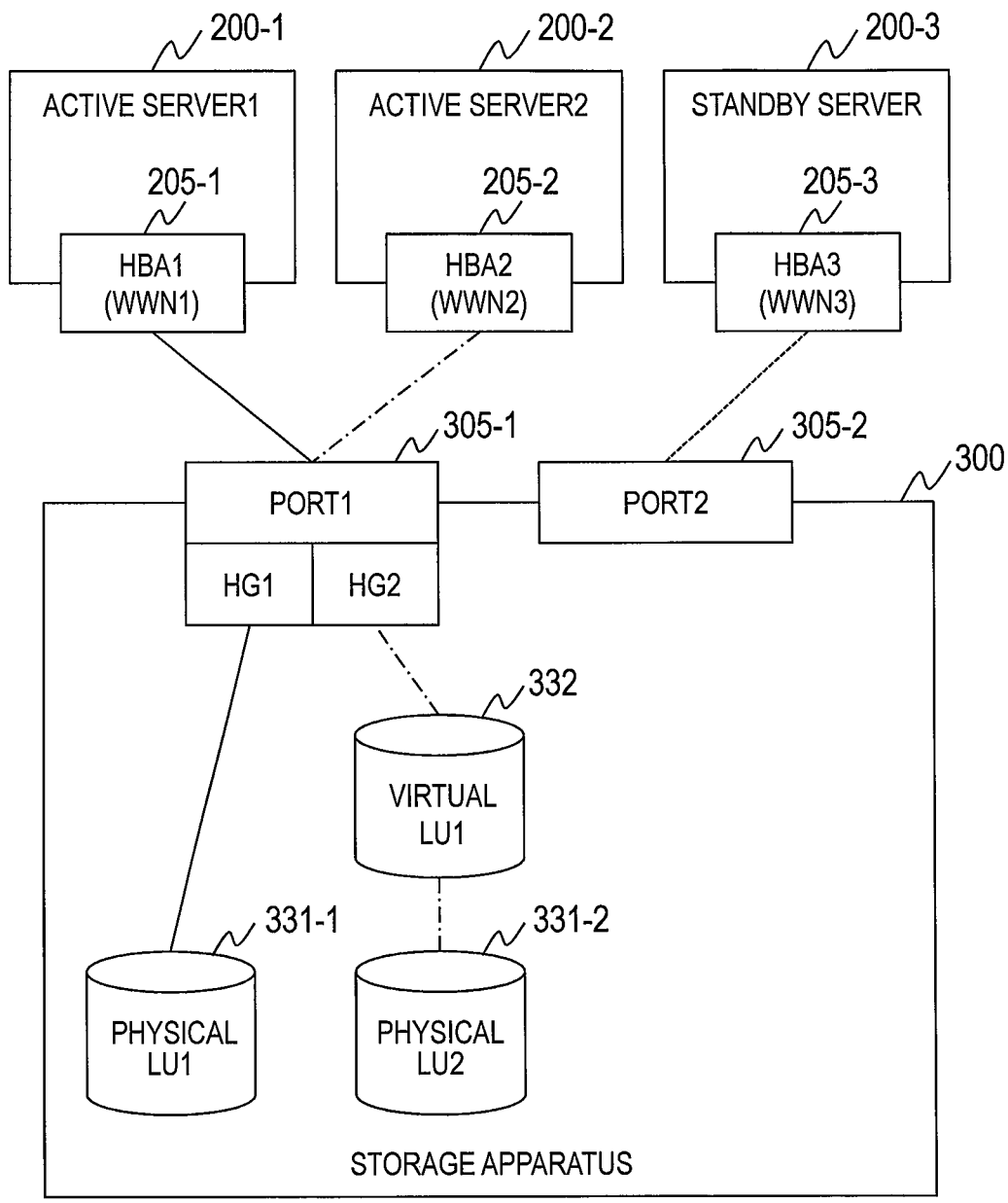
FIG. 4 is an explanatory diagram illustrating an example of a coupling relationship between the servers and the storage apparatus according to the first embodiment of this invention.

The LU management part 140 requests the storage apparatus 300 to generate the virtual LU 332 illustrated in FIG. 4 to be provided to the server 200. Further, the LU management part 140 requests the storage apparatus 300 to change the LU 330 to be provided to the active server 200.

The server management table 160 stores information for managing the configuration of the server 200. The server management table 160 is described later in detail with reference to FIG. 5. The path management table 170 stores information relating to a path for coupling between the server 200 and the storage apparatus 300. The path management table 170 is described later in detail with reference to FIG. 6. The storage device management table 180 stores information relating to the LU 330 provided to the server 200. The storage device management table 180 is described later in detail with reference to FIG. 7.

Figure 2:
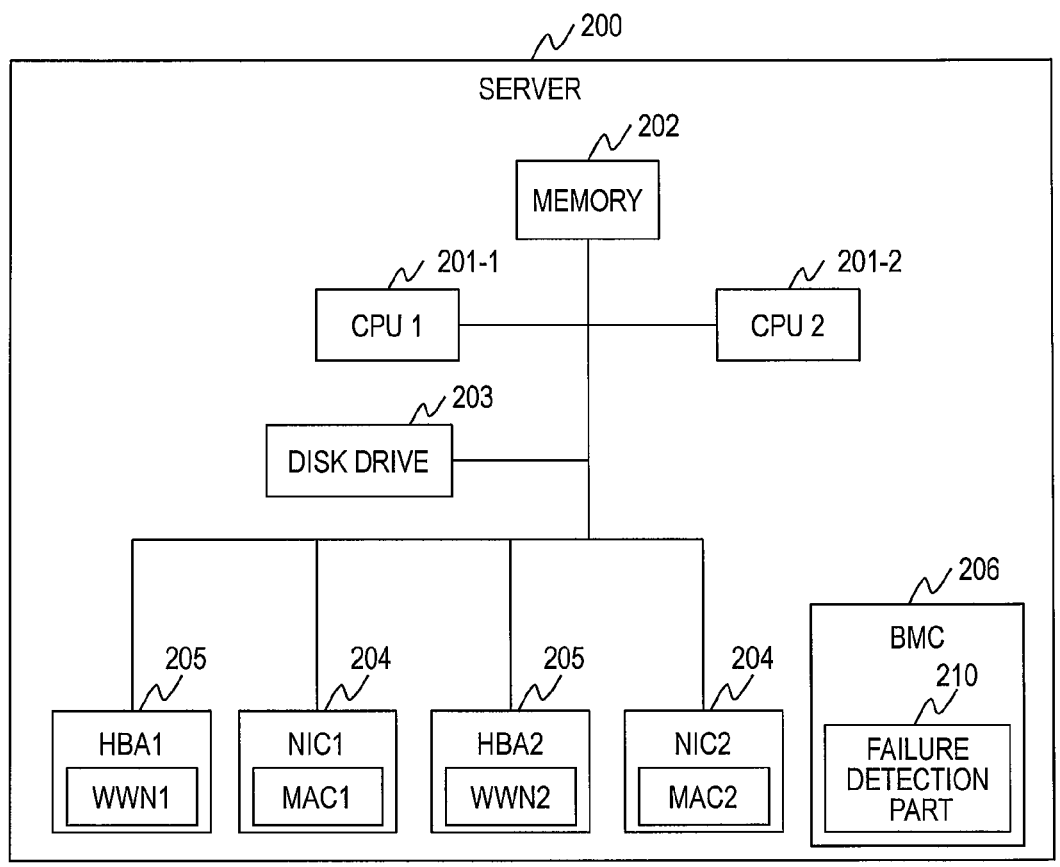
FIG. 2 is a block diagram illustrating an example of a hardware configuration of each server according to the first embodiment of this invention.

FIG. 2 is a block diagram illustrating an example of the hardware configuration of each server 200 according to the first embodiment of this invention.

The server 200 includes a plurality of CPUs 201, a memory 202, a disk drive 203, a plurality of NICs 204, a plurality of HBAs 205, and a baseboard management controller (BMC) 206. It should be noted that each server 200 may include an input device such as a keyboard and a mouse and an output device such as a display.

The CPU 201 includes at least one CPU core, and executes the programs stored in the memory 202. It is possible to implement functions of each server 200 by the CPU 201 executing the programs. In the following, when a description is given with the use of a program as a subject, such description indicates that the program is executed by the CPU 201.

The memory 202 stores the programs executed by the CPU 201 and information that is necessary for executing the programs. In this embodiment, the memory 202 of the active server 200 stores programs (not shown) such as an OS and an application. On the other hand, the standby server 200 and the candidate server 200 are in a power-off state, and hence the above-mentioned programs are not stored in the memory 202 of the standby server 200 or the memory 202 of the candidate server 200.

The NIC 204 is an interface for communicating to/from another apparatus through the network. In this embodiment, the server 200 includes a NIC 204 for coupling to a network for management and a NIC 204 for coupling to a network for a service.

The HBA 205 is an interface for accessing the storage apparatus 300. For example, the active server 200 includes an HBA 205 for accessing an LU that stores data used for booting and an HBA 205 for accessing an LU that stores data for the application.

A MAC address is assigned to the NIC 204 as unique identification information, and a WWN is assigned to the HBA 205 as unique identification information. In the example illustrated in FIG. 2, a MAC 1 is assigned to a NIC 1, a MAC 2 is assigned to a NIC 2, a WWN 1 is assigned to an HBA 1, and a WWN 2 is assigned to an HBA 2.

The disk drive 203 stores information necessary to execute the service. For example, the disk drive 203 stores the program for implementing the application or the like.

The BMC 206 manages a status of the server 200. The BMC 206 includes a failure detection part 210 for monitoring whether or not a failure occurs in the server 200. It should be noted that the BMC 206 also includes a power supply control unit or the like for controlling power to the server 200.

In a case of detecting that a failure occurs in the server 200, the failure detection part 210 notifies the management server 100 that a failure has occurred. A notification thereof includes at least identification information for identifying the server 200.

Figure 3:
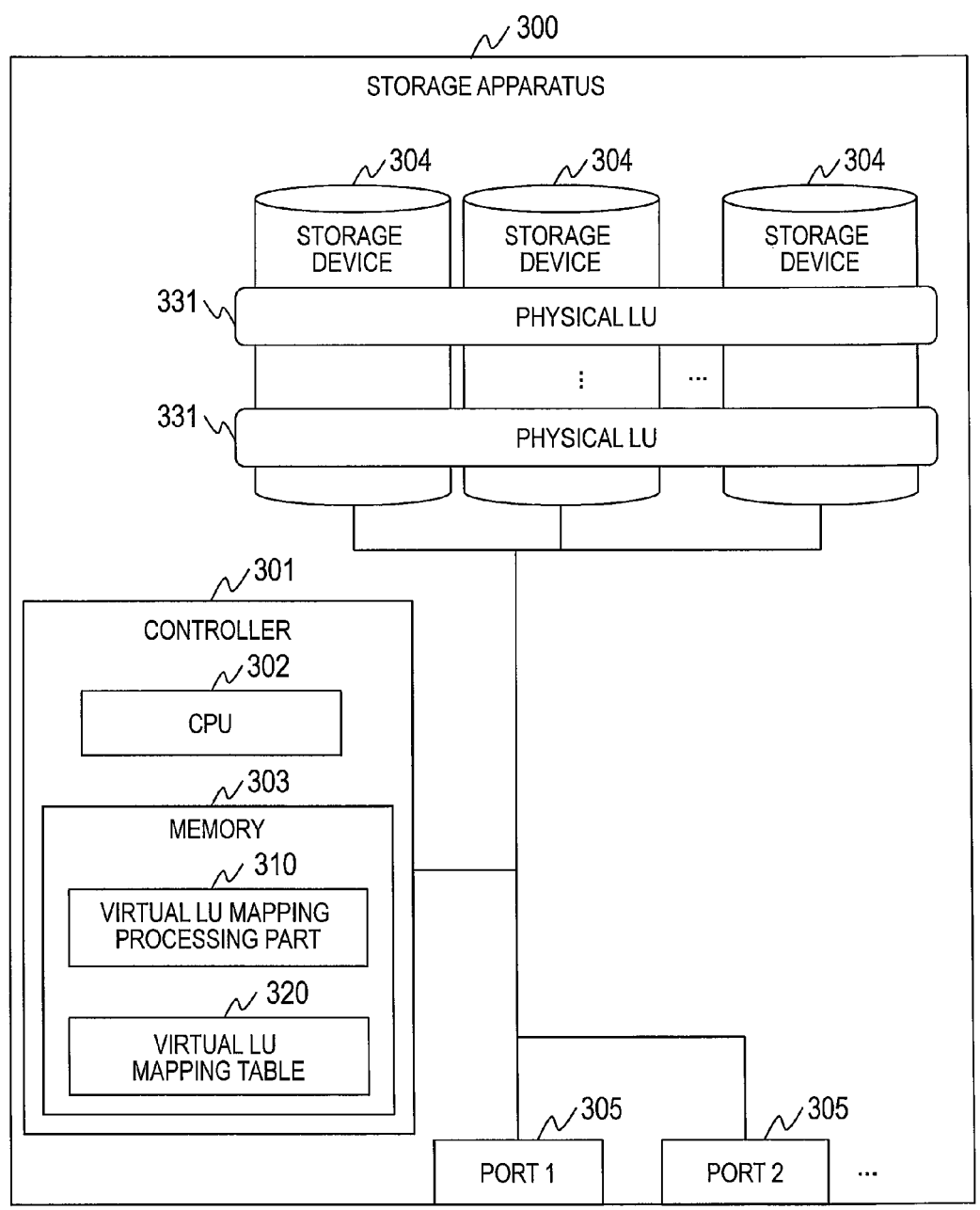
FIG. 3 is a block diagram illustrating an example of a hardware and software configurations of a storage apparatus according to the first embodiment of this invention.

FIG. 3 is a block diagram illustrating an example of the hardware and software configurations of the storage apparatus 300 according to the first embodiment of this invention.

The storage apparatus 300 includes a controller 301, the plurality of storage devices 304, and a plurality of ports 305.

The controller 301 performs overall control of the storage apparatus 300. The controller 301 includes a CPU 302 and a memory 303.

The CPU 302 includes at least one CPU core, and executes the programs stored in the memory 303. It is possible to implement functions of the storage apparatus 300 by the CPU 302 executing the programs. In the following, when a description is given with the use of a program as a subject, such description indicates that the program is executed by the CPU 302.

The memory 303 stores the programs executed by the CPU 302 and information that is necessary for executing the programs. Specifically, the memory 303 includes a program for implementing a virtual LU mapping processing part 310 and a virtual LU mapping table 320.

The virtual LU mapping processing part 310 manages mapping between a physical LU 331 illustrated in FIG. 4 and the virtual LU 332 illustrated in FIG. 4. The virtual LU mapping table 320 stores information related to a mapping relationship between the physical LU 331 illustrated in FIG. 4 and the virtual LU 332 illustrated in FIG. 4. The virtual LU mapping table 320 is described later in detail with reference to FIG. 8.

The storage device 304 is an apparatus used to provide the server 200 with the storage area. As the storage device 304, for example, a hard disk drive (HDD) and a solid state drive (SSD) are conceivable. In this embodiment, a RAID is built by using the plurality of storage devices 304.

The storage apparatus 300 generates a plurality of physical LUs 331 illustrated in FIG. 4 by logically partitioning a RAID volume. The physical LU 331 illustrated in FIG. 4 stores programs such as an OS and an application and various kinds of data. Further, the storage apparatus 300 generates the virtual LU 332 illustrated in FIG. 4 as a virtualized storage area.

The port 305 is a port for coupling to the server 200. In this embodiment, two ports 305 are illustrated in the figures, but the number of ports 305 provided to the storage apparatus 300 may be at least two.

FIG. 4 is an explanatory diagram illustrating an example of a coupling relationship between the servers 200 and the storage apparatus 300 according to the first embodiment of this invention.

The active server 1 (200-1) is coupled to the port 1 (305-1) of the storage apparatus 300 via the HBA 1 (205-1) to which the WWN 1 is assigned. The active server 2 (200-2) is coupled to the port 1 (305-1) of the storage apparatus 300 via the HBA 2 (205-2) to which the WWN 2 is assigned. Further, a standby server 200-3 is coupled to the port 2 (305-2) of the storage apparatus 300 via an HBA 3 (205-3) to which a WWN 3 is assigned.

The storage apparatus 300 according to this embodiment sets a host group for each port 305. The host group represents a group for controlling an accessible LU 330. The host group includes at least one WWN of the server 200 coupled to the port 305.

In the example illustrated in FIG. 4, the server 200 included in a host group 1 is set to access a physical LU 1 (331-1), and the server 200 included in a host group 2 is set to access a virtual LU 1 (332). The active server 1 (200-1) recognizes the physical LU 1 (331-1) as a storage device therefor, and the active server 2 (200-2) recognizes the virtual LU 1 (332) as a storage device therefor.

Here, the LU 330 is described. In this embodiment, the LU 330 includes the physical LU 331 and the virtual LU 332.

The physical LU 331 is a storage area generated by logically partitioning the storage area of the storage device 304, and stores programs such as an operating system (OS) and the application and various kinds of information necessary to execute the programs. The virtual LU 332 is a virtualized storage area, and is associated with at least one physical LU 331. In other words, at least one physical LU 331 is mapped to the virtual LU 332.

The storage apparatus 300 manages a correspondence relationship between the virtual LU 332 and the physical LU 331 (mapping relationship) as the virtual LU mapping table 320. Therefore, in a case of receiving access to an arbitrary virtual LU 332, the storage apparatus 300 refers to the virtual LU mapping table 320 to access the physical LU 331 associated with the virtual LU 332.

A device ID is assigned to the physical LU 331 and the virtual LU 332. The server 200 accesses the storage apparatus 300 based on the device ID. In this embodiment, the device ID of the same kind is assigned to the physical LU 331 and the virtual LU 332, and hence the active server 200 recognizes both the physical LU 331 and the virtual LU 332 as one storage device.

In the following description, the physical LU 331 and the virtual LU 332 are referred to collectively as "LU 330" when not distinguished from each other. Further, in the following description, the physical LU 331 or the virtual LU 332 provided to the active server 200 is referred to also as "provided LU".

In the example illustrated in FIG. 4, the active server 1 (200-1) accesses the physical LU 1 (331-1) via the HBA 1 (205-1) and the port 1 (305-1), and the active server 2 (200-2) accesses the virtual LU 1 (332) via the HBA 2 (205-2) and the port 1 (305-1). Further, in a case of receiving access to the virtual LU 1 (332), the storage apparatus 300 accesses a physical LU 2 (331-2). In the first embodiment, the LU 330 is not provided to the standby server 200-3.

FIG. 5 is an explanatory diagram showing an example of the server management table 160 according to the first embodiment of this invention.

The server management table 160 includes a server ID 501, CPU information 502, memory information 503, I/O device information 504, and a status 505.

The server ID 501 stores an identifier for uniquely identifying the server 200.

The CPU information 502 stores information relating to the CPU 201 included in the server 200. The CPU information 502 includes a number 506 of CPUs and a frequency 507. The number 506 of CPUs stores the number of CPUs 201 included in the server 200. The frequency 507 stores a frequency of the CPU 201 included in the server 200.

The memory information 503 stores information relating to the memory 202 included in the server 200. In this embodiment, the memory information 503 stores a value indicating a capacity of the memory 202.

The I/O device information 504 is information relating to an I/O device included in the server 200. The I/O device information 504 includes a NIC 508 and an HBA 509. The NIC 508 stores a MAC address of the NIC 204 included in the server 200. The HBA 509 stores the WWN of the HBA 205 included in the server 200.

The NIC 508 stores the MAC addresses corresponding to the number of NICs 204 included in the server 200, and the HBA 509 stores the WWNs corresponding to the number of HBAs 205 included in the server 200. For example, in a case where the server 200 includes two NICs 204 and three HBAs 205, the NIC 508 stores two MAC addresses, and the HBA 509 stores three WWNs.

The status 505 stores information indicating which of the active server 200 and the standby server 200 the server 200 is. In this embodiment, "active" is stored in the status 505 of an entry corresponding to the active server 200, and "standby" is stored in the status 505 of the entry corresponding to the standby server 200. It should be noted that the status 505 of the entry corresponding to the candidate server 200 is assumed to be blank.

In this embodiment, as described later, the standby server 200 is selected from among the candidate servers 200.

FIG. 6 is an explanatory diagram showing an example of the path management table 170 according to the first embodiment of this invention.

The path management table 170 includes a server ID 601, an HBA 602, a storage apparatus ID 603, a port number 604, a host group ID 605, and a device ID 606.

The server ID 601 stores an identifier for uniquely identifying the server 200. The server ID 601 is the same information as the server ID 501. The HBA 602 stores information relating to the HBA 205 included in the server 200. The HBA 602 is the same information as the HBA 509.

The storage apparatus ID 603 stores the identifier for uniquely identifying the storage apparatus 300 coupled to the server 200. The port number 604 stores an identification number of the port 305 coupled to the server 200. The host group ID 605 stores an identifier of the host group set for the port 305 corresponding to the port number 604.

The device ID 606 stores an identifier for uniquely identifying the LU 330 provided to the server 200, in other words, the provided LU. In the following description, the identifier of the LU 330 is referred to also as "device ID".

In the first embodiment, the LU 330 is not provided to the standby server 200 or the candidate server 200, and hence the host group ID 605 and the device ID 606 of the entry corresponding to the standby server 200 are blank.

FIG. 7 is an explanatory diagram showing an example of the storage device management table 180 according to the first embodiment of this invention.

The storage device management table 180 includes a storage apparatus ID 701, a device ID 702, a capacity 703, and a type 704.

The storage apparatus ID 701 stores an identifier for uniquely identifying the storage apparatus 300. The storage apparatus ID 701 is the same information as the storage apparatus ID 603. The device ID 702 stores an identifier for uniquely identifying the provided LU. The device ID 702 is the same information as the device ID 606.

The capacity 703 stores a value indicating a storage capacity of the provided LU. The type 704 stores information indicating a type of the provided LU. In this embodiment, in a case where the provided LU is the physical LU 331, "physical" is stored in the type 704, and in a case where the provided LU is the virtual LU 332, "virtual" is stored in the type 704.

FIG. 8 is an explanatory diagram showing an example of the virtual LU mapping table 320 according to the first embodiment of this invention.

The virtual LU mapping table 320 includes a physical device ID 801 and a virtual device ID 802.

The physical device ID 801 stores the device ID of the physical LU 331. The virtual device ID 802 stores the device ID of the virtual LU 332.

Figure 9:
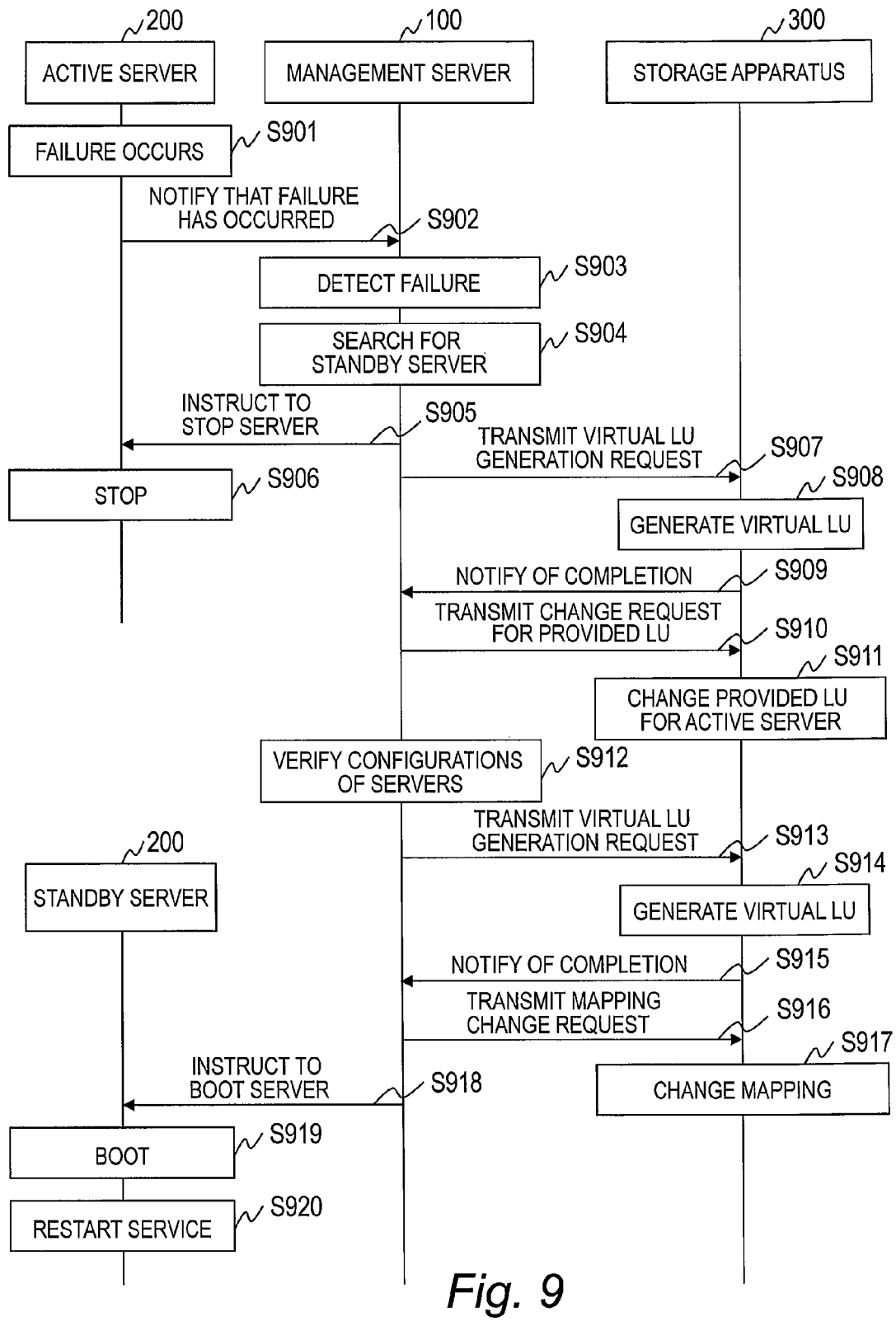
FIG. 9 is a sequence diagram illustrating a procedure for failover processing according to the first embodiment of this invention.

FIG. 9 is a sequence diagram illustrating a procedure for the failover processing according to the first embodiment of this invention.

In a case of detecting that a failure occurs in the active server 200 (Step S901), the failure detection part 210 of the BMC 206 notifies the management server 100 that a failure has occurred (Step S902). A notification thereof includes an identifier of the active server 200.

In a case of receiving the notification that the failure has occurred from the active server 200, the management server 100 detects that the active server 200 has failed (Step S903), and searches for the standby server 200 (Step S904).

The management server 100 transmits a stop instruction to the active server 200 (Step S905).

In a case of receiving the stop instruction, the active server 200 stops the active server 200 itself (Step S906). Specifically, the BMC 206 receives the stop instruction, and shifts the active server 200 to a power-off state.

The management server 100 transmits a virtual LU generation request for the active server 200 to the storage apparatus 300 (Step S907).

In a case of receiving the virtual LU generation request for the active server 200, the storage apparatus 300 generates the virtual LU 332 based on the request (Step S908), and notifies the management server 100 that generation of the virtual LU 332 for the active server 200 has been completed (Step S909). In the following description, the notification that the generation of the virtual LU 332 for the active server 200 has been completed is referred to also as "first generation completion notification".

After receiving the first generation completion notification, the management server 100 transmits a change request for the provided LU to the storage apparatus 300 (Step S910).

In a case of receiving the change request for the provided LU, the storage apparatus 300 provides the active server 200 with the generated virtual LU 332, and maps the physical LU 331 to the virtual LU 332 (Step S911).

The management server 100 verifies the configurations of the active server 200 and the standby server 200 (Step S912), and transmits the virtual LU generation request for the standby server 200 (Step S913).

In a case of receiving the virtual LU generation request for the standby server 200, the storage apparatus 300 generates the virtual LU 332 based on the request (Step S914), and notifies the management server 100 that generation of the virtual LU 332 for the standby server 200 has been completed (Step S915). In the following description, the notification that the generation of the virtual LU 332 for the standby server 200 has been completed is referred to also as "second generation completion notification".

After receiving the second generation completion notification, the management server 100 transmits a mapping change request to the storage apparatus 300 (Step S916).

In a case of receiving the mapping change request, the storage apparatus 300 changes the virtual LU 332 to be mapped the physical LU 331 (Step S917). With this change, a mapping destination of the physical LU 331 is changed from the virtual LU 332 for the active server 200 to the virtual LU 332 for the standby server 200.

After that, the management server 100 transmits a boot instruction to the standby server 200 (Step S918).

In a case of receiving the boot instruction, the standby server 200 boots the standby server 200 itself (Step S919), and restarts the service as a new active server 200 (Step S920). Specifically, the BMC 206 receives the boot instruction, and shifts the standby server 200 to, a power-on state. Further, the standby server 200 accesses the provided LU to read the programs such as the OS and the application, and restarts the service.

Next, a detailed description is made of processing executed by the management server 100 and the storage apparatus 300.

Figure 10A:
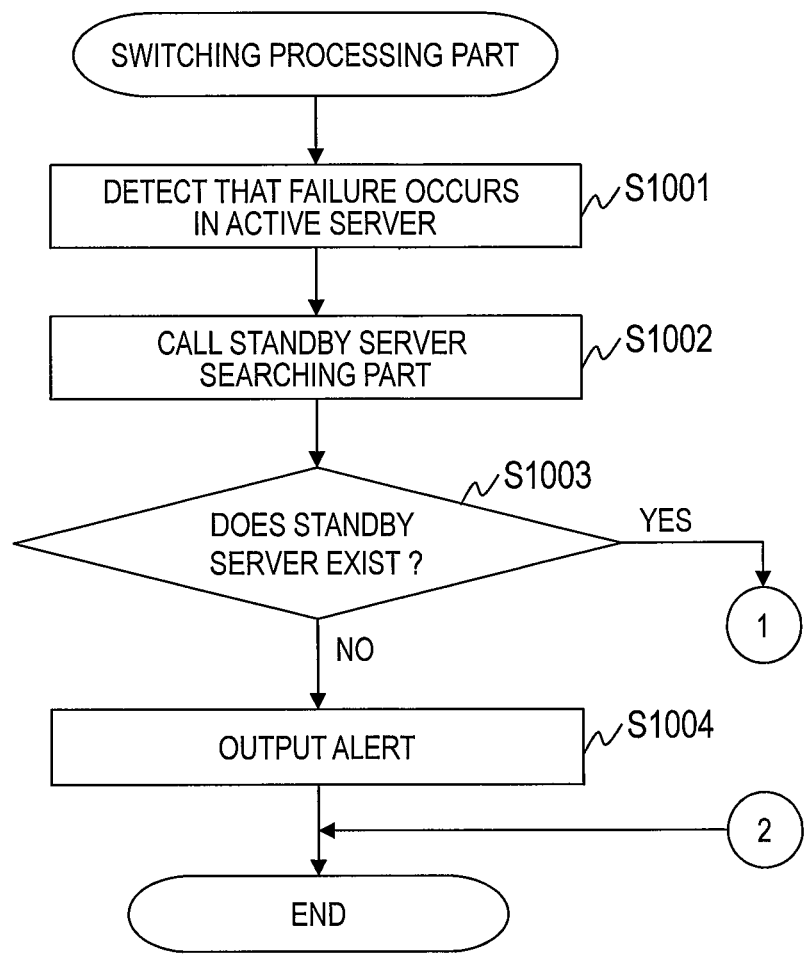
FIG. 10A and FIG. 10B are flowcharts illustrating processing executed by a switching processing part according to the first embodiment of this invention.
Figure 10B:
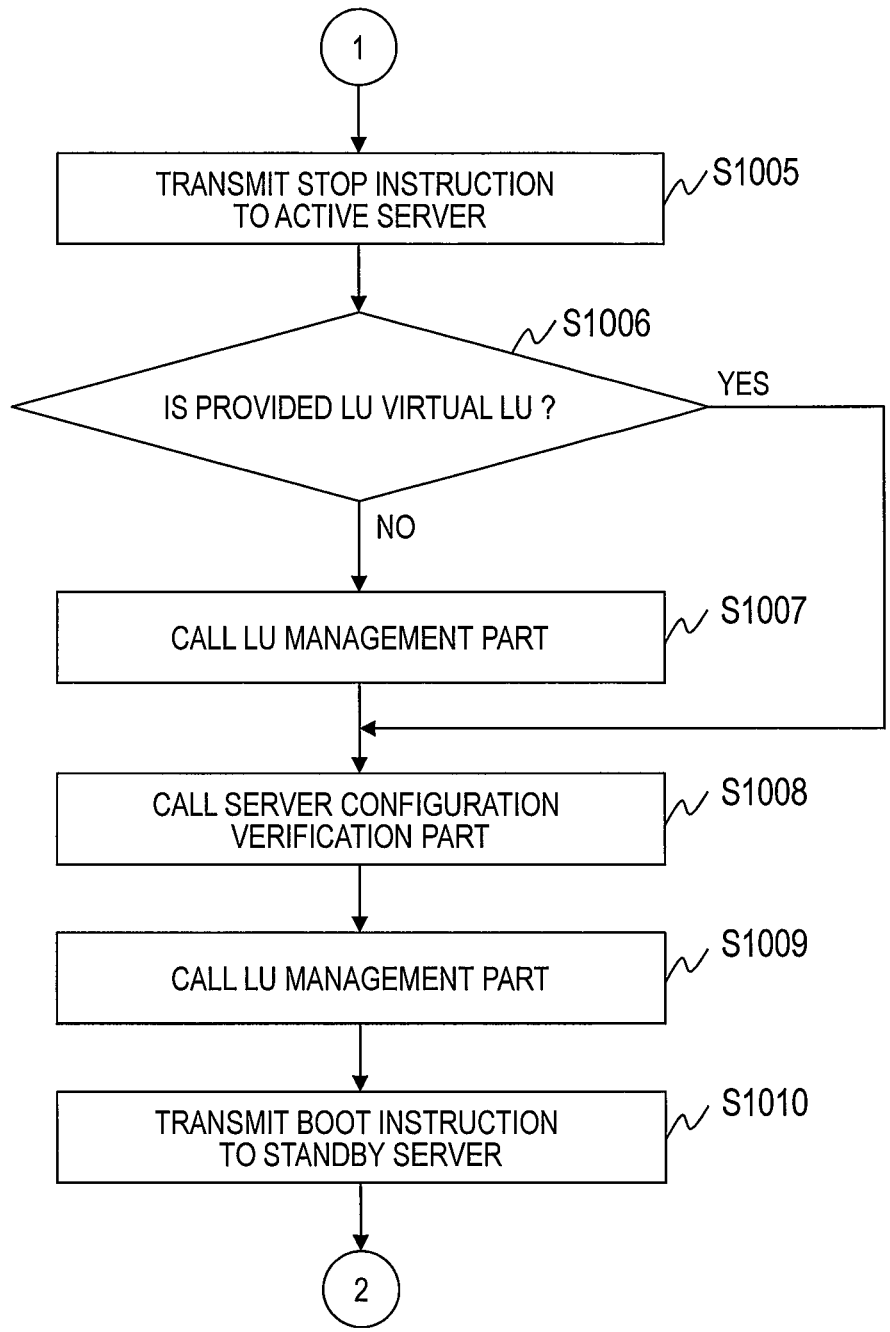

FIG. 10A and FIG. 10B are flowcharts illustrating processing executed by the switching processing part 110 according to the first embodiment of this invention.

The switching processing part 110 detects that a failure occurs in the active server 200 (Step S1001).

Specifically, in a case of receiving the notification that a failure has occurred in the active server 200 from the failure detection part 210 of the BMC 206, the switching processing part 110 detects that the active server 200 has failed. The notification that the failure has occurred which is received from the active server 200 includes the identifier of the active server 200.

The switching processing part 110 calls the server searching part 120 (Step S1002). At this time, the switching processing part 110 inputs the identifier of the active server 200 to the server searching part 120.

The switching processing part 110 is in a wait state until a processing result is output from the server searching part 120. It should be noted that search processing executed by the server searching part 120 is described later in detail with reference to FIG. 11.

The switching processing part 110 determines whether or not the candidate server 200 to be the standby server 200 exists based on the processing result output from the server searching part 120 (Step S1003).

In this embodiment, in a case where the processing result includes the identifier of the server 200, it is determined that the candidate server 200 to be the standby server 200 exists.

In a case where it is determined that the candidate server 200 to be the standby server 200 does not exist, the switching processing part 110 outputs an alert to the administrator (Step S1004), and brings the processing to an end.

In a case where it is determined that the candidate server 200 to be the standby server 200 exists, the switching processing part 110 transmits the stop instruction to the active server 200 (Step S1005).

The switching processing part 110 refers to the path management table 170 and the storage device management table 180 to determine whether or not the provided LU is the virtual LU 332 (Step S1006). Specifically, the following processing is executed.

The switching processing part 110 refers to the path management table 170 based on the identifier of the active server 200 to search for the entry corresponding to the active server 200. The switching processing part 110 obtains the device ID of the provided LU from the device ID 606 of the retrieved entry.

The switching processing part 110 refers to the storage device management table 180 based on the obtained device ID to search for the entry corresponding to the provided LU. The switching processing part 110 determines whether or not the type 704 of the retrieved entry is "virtual". In a case where it is determined that the type 704 of the retrieved entry is "virtual", the switching processing part 110 determines that the provided LU is the virtual LU 332.

It should be noted that, in a case where a plurality of provided LUs exist in the active server 200, the following two kinds of processing are conceivable.

In one method, the determination is performed for all the provided LUs of the active server 200. Specifically, the switching processing part 110 refers to the path management table 170 to obtain the device IDs of all the provided LUs. The switching processing part 110 refers to the storage device management table 180 to search for the entries of all the provided LUs and determine whether or not the types 704 of all the retrieved entries are "virtual". In a case where it is determined that the type 704 of at least one entry is not "virtual", the switching processing part 110 determines that the provided LU is not the virtual LU 332.

In the other method, the determination is performed for the provided LU corresponding to a boot disk for the active server 200. Specifically, the switching processing part 110 refers to the path management table 170 to obtain the device ID of the provided LU corresponding to the boot disk. The switching processing part 110 refers to the storage device management table 180 to search for the entry of the provided LU, and determines whether or not the type 704 of the retrieved entry is "virtual". In a case where it is determined that the type 704 of the retrieved entry is not "virtual", the switching processing part 110 determines that the provided LU is not the virtual LU 332.

The processing of Step S1006 is as described above.

In a case where it is determined that the provided LU is the virtual LU 332, the switching processing part 110 advances to Step S1008.

In a case where it is determined that the provided LU is not the virtual LU 332, the switching processing part 110 calls the LU management part 140 in order to generate the virtual LU 332 to be provided to the active server 200 (Step S1007). At this time, the switching processing part 110 inputs the identifier of the active server 200 and the device ID of the provided LU (.physical LU 331) to the LU management part 140.

The switching processing part 110 is in a wait state until notified by the LU management part 140 of processing completion. It should be noted that the processing executed by the LU management part 140 is described later in detail with reference to FIG. 13.

After receiving the notification of processing completion from the LU management part 140, the switching processing part 110 calls the server configuration verification part 130 (Step S1008). At this time, the switching processing part 110, inputs the identifier of the active server 200 and an identifier of the standby server 200 to the server configuration verification part 130.

The switching processing part 110 is in a wait state until a processing result is output from the server configuration verification part 130. It should be noted that processing executed by the server configuration verification part 130 is described later in detail with reference to FIG. 12.

The switching processing part 110 calls the LU management part 140 in order to generate the virtual LU 332 to be provided to the standby server 200 (Step S1009). At this time, the switching processing part 110 inputs the identifier of the active server 200 and the processing result output from the server configuration verification part 130 to the LU management part 140. It should be noted that the output processing result includes, as described later, the capacity of the provided LU, the WWN of the standby server 200, and the identifier of the port 305 coupled to the standby server 200.

The switching processing part 110 is in a wait state until notified by the LU management part 140 of processing completion. It should be noted that the processing executed by the LU management part 140 is described later in detail with reference to FIG. 13.

After receiving the notification of the processing completion from the LU management part 140, the switching processing part 110 transmits the boot instruction to the standby server 200 (Step S1010), and brings the processing to an end.

In this embodiment, in the processing of Step S1007, the active server 200 is provided with the virtual LU 332. In a case where fail-back processing is executed, the active server 200 is provided with the virtual LU 332 in advance, thereby producing an effect of reducing overhead of the fail-back processing. Further, all the active servers 200 are provided with the virtual LU 332, thereby facilitating the switching processing of the server.

It should be noted that the processing of Step S1006 to Step S1008 may be omitted in order to increase efficiency of the failover processing.

Figure 11:
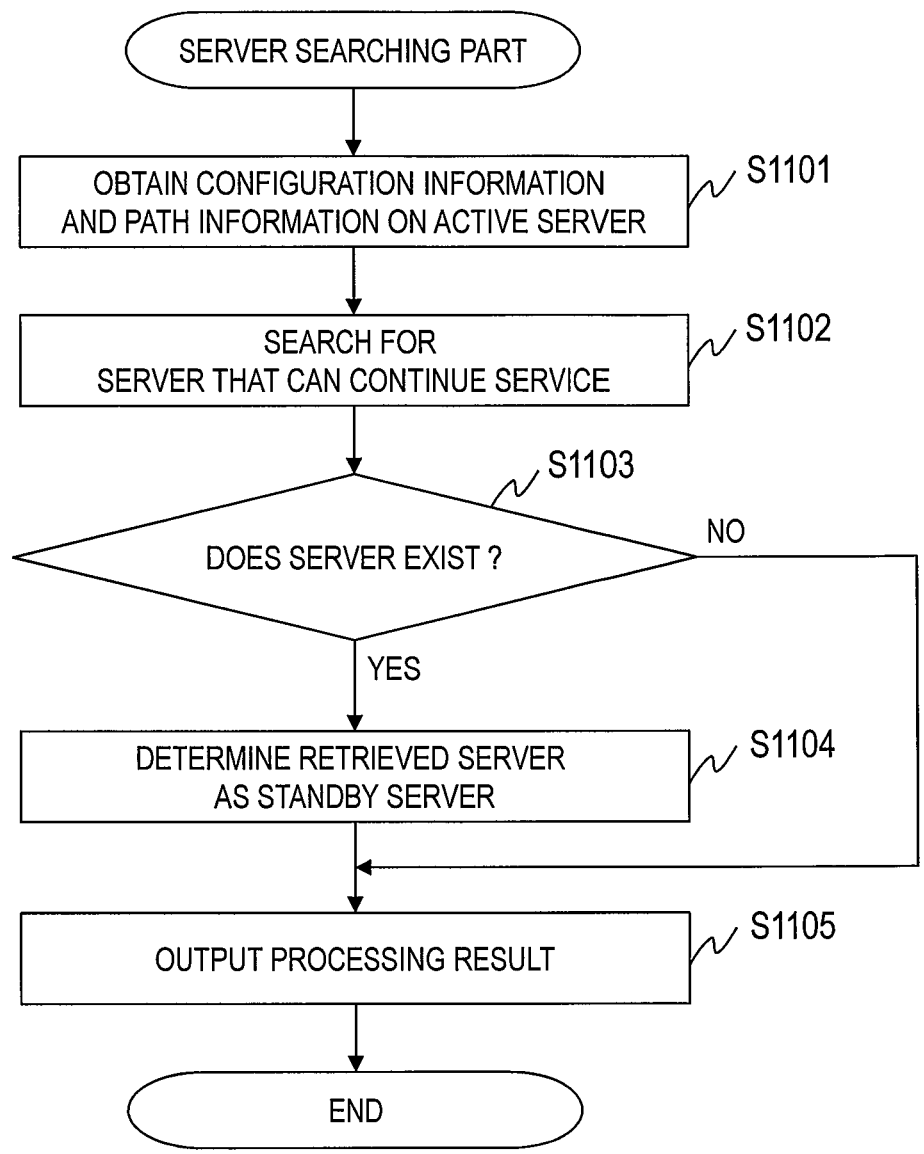
FIG. 11 is a flowchart illustrating processing executed by a server searching part according to the first embodiment of this invention.

FIG. 11 is a flowchart illustrating the processing executed by the server searching part 120 according to the first embodiment of this invention.

The server searching part 120 starts the processing when called by the switching processing part 110. It should be noted that the identifier of the active server 200 is input to the server searching part 120.

The server searching part 120 obtains configuration information and path information on the active server 200 (Step S1101).

Specifically, the server searching part 120 refers to the server management table 160 based on the input identifier of the active server 200 to search for the entry corresponding to the active server 200. Further, the server searching part 120 refers to the path management table 170 based on the input identifier of the active server 200 to search for the entry corresponding to the active server 200.

The server searching part 120 searches the candidate servers 200 for the server 200 that can continue the service executed by the active server 200 based on the obtained configuration information and path information on the active server 200 (Step S1102). Specifically, the following processing is executed.

The server searching part 120 refers to the server management table 160 to extract the entry whose status 505 is blank, in other words, the candidate server 200. The server searching part 120 refers to the path management table 170 based on the server ID 501 of the extracted entry to obtain the path information on the candidate server 200.

The server searching part 120 extracts the candidate server 200 coupled to the same storage apparatus 300 as the storage apparatus 300 coupled to the active server 200 based on the path information on the active server 200 and the path information on the candidate, server 200. In other words, the entry whose storage apparatus ID 603 matches the identifier of the storage apparatus 300 coupled to the active server 200 is extracted.

The server searching part 120 generates a list of the server IDs 601 of the extracted entries. The server searching part 120 selects one candidate server 200 from the generated list.

The server searching part 120 compares the obtained configuration information on the active server with the configuration information on the selected candidate server 200, and determines whether or not the active server 200 and the candidate server 200 have the same hardware configuration.

In a case where the active server 200 and the candidate server 200 have the same hardware configuration, the server searching part 120 determines the selected candidate server 200 as the server 200 that can continue the service.

It should be noted that the above-mentioned search method is merely an example, and this invention is not limited thereto.

Subsequently, the server searching part 120 determines whether or not the server 200 that can continue the service exists (Step S1103).

In a case where it is determined that the server 200 that can continue the service does not exist, the server searching part 120 outputs the processing result including information indicating an error (Step S1105), and brings the processing to an end.

In this case, in Step S1003, the switching processing part 110 determines that the candidate server 200 to be the standby server 200 does not exist.

In a case where it is determined that the server that can continue the service exists, the server searching part 120 determines the retrieved server 200 as the standby server 200 (Step S1104). After that, the server searching part 120 outputs the processing result including the identifier of the standby server 200 (Step S1105), and brings the processing to an end.

Further, the server searching part 120 stores "standby" as the status 505 of the entry corresponding to the retrieved candidate server 200.

Figure 12:
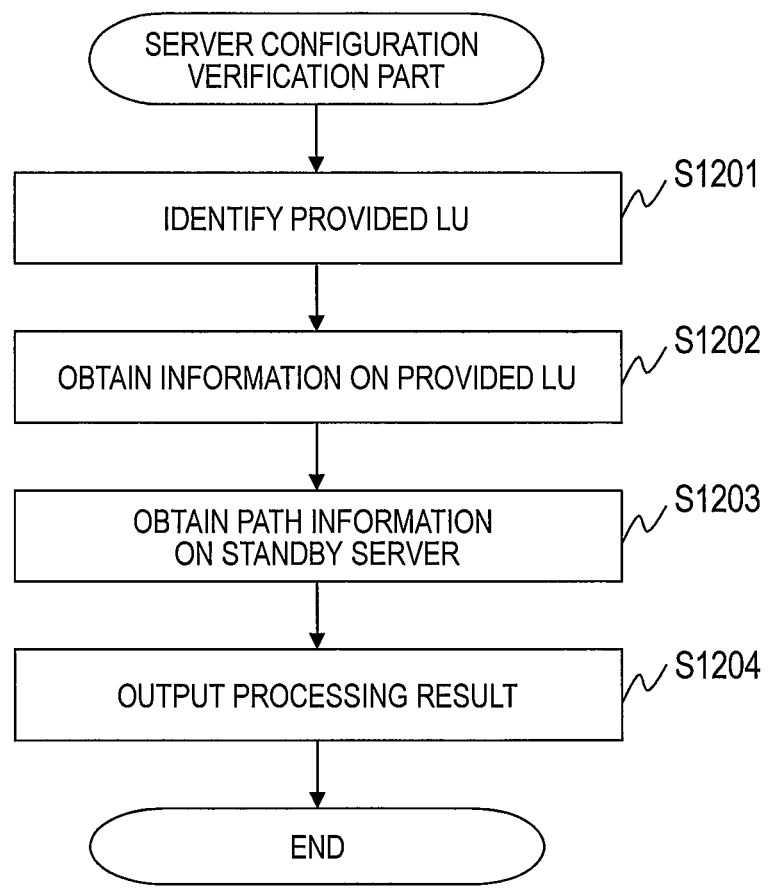
FIG. 12 is a flowchart illustrating processing executed by a server configuration verification part according to the first embodiment of this invention.

FIG. 12 is a flowchart illustrating the processing executed by the server configuration verification part 130 according to the first embodiment of this invention.

The server configuration verification part 130 starts the processing when called by the switching processing part 110. It should be noted that the identifier of the active server 200 and the identifier of the standby server 200 are input to the server configuration verification part 130.

The server configuration verification part 130 refers to the path management table 170 to identify the provided LU (Step S1201).

Specifically, the server configuration verification part 130 refers to the path management table 170 based on the input identifier of the active server 200 to search for the entry corresponding to the active server 200. The server configuration verification part 130 obtains the device ID of the provided LU from the device ID 606 of the retrieved entry.

The server configuration verification part 130 refers to the storage device management table 180 to obtain the information on the identified provided LU (Step S1202).

Specifically, the server configuration verification part 130 refers to the storage device management table 180 based on the device ID of the identified provided LU to search for the entry corresponding to the provided LU. The server configuration verification part 130 obtains a value stored in the capacity 703 of the retrieved entry.

The server configuration verification part 130 refers to the path management table 170 to obtain the path information of the standby server 200 (Step S1203).

Specifically, the server configuration verification part 130 refers to the path management table 170 based on the input identifier of the standby server 200 to search for the entry corresponding to the standby server 200. The server configuration verification part 130 obtains the values stored in the HBA 602 and port number 604 of the retrieved entry.

The server configuration verification part 130 outputs the processing result including the obtained information to the switching processing part 110 (Step S1204), and brings the processing to an end.

The processing result includes the capacity of the provided LU, the WWN of the standby server 200, and the identifier of the port 305 coupled to the standby server 200.

Figure 13:
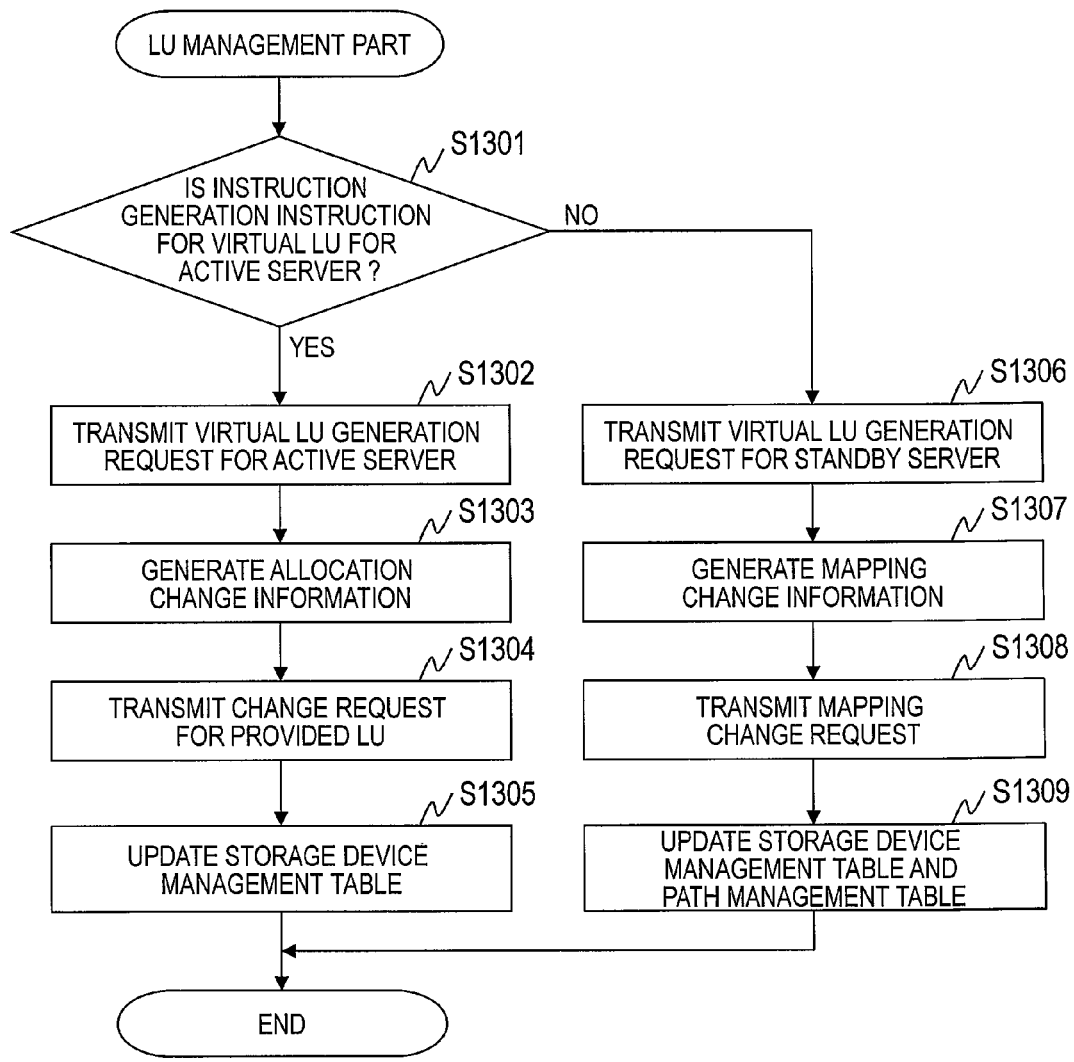
FIG. 13 is a flowchart illustrating processing executed by an LU management part according to the first embodiment of this invention.

FIG. 13 is a flowchart illustrating the processing executed by the LU management part 140 according to the first embodiment of this invention.

The LU management part 140 starts the processing when called by the switching processing part 110. It should be noted that the processing executed by the LU management part 140 branches off as follows by an instruction serving as a calling trigger issued from the switching processing part 110.

The LU management part 140 determines whether or not the instruction serving as the calling trigger is a generation instruction for the virtual LU 332 for the active server 200 (Step S1301).

Specifically, the LU management part 140 determines based on the information input from the switching processing part 110 whether or not the processing based on the virtual LU generation request for the active server 200 is being performed. In a case where the identifier of the active server and the device ID of the physical LU 331 are input, the LU management part 140 determines that the instruction serving as the calling trigger is the generation instruction for the virtual LU 332 for the active server 200. On the other hand, in a case where the identifier of the active server 200, the capacity of the provided LU, the WWN of the standby server 200, and the identifier of the port 305 coupled to the standby server 200 are input, the LU management part 140 determines that the instruction serving as the calling trigger is the generation instruction for the virtual LU 332 for the standby server 200.

In a case where it is determined that the instruction serving as the calling trigger is a virtual LU generation instruction for the active server 200, the LU management part 140 transmits the virtual LU generation request for the active server 200 to the storage apparatus 300 (Step S1302).

Specifically, the LU management part 140 refers to the storage device management table 180 based on the input device ID of the physical LU 331 to search for the entry corresponding to the physical LU 331. The LU management part 140 obtains the value stored in the capacity 703 of the retrieved entry. The LU management part 140 transmits the virtual LU generation request for the active server 200 including the obtained value to the storage apparatus 300. This generates the virtual LU 332 having the same capacity as the physical LU 331.

The LU management part 140 is in a wait state until the generation completion notification is received from the storage apparatus 300.

After receiving the generation completion notification from the storage apparatus 300, the LU management part 140 generates LU allocation change information (Step S1303). Specifically, the following processing is executed.

The LU management part 140 refers to the storage device management table 180 to determine the device ID to be newly assigned to the physical LU 331. In this embodiment, the LU management part 140 determines the device ID so as not to overlap with another device ID.

The LU management part 140 generates the information for assigning the input device ID of the physical LU 331 to the generated virtual LU 332 and for assigning the determined new device ID to the physical LU 331. The generated information is allocation change information.

The processing of Step S1303 is as described above.

Subsequently, the LU management part 140 transmits the change request for the provided LU including the generated allocation change information to the storage apparatus 300 (Step S1304). The LU management part 140 updates the storage device management table 180 (Step S1305), notifies the switching processing part 110 of the completion of the processing, and then brings the processing to an end.

Specifically, the LU management part 140 refers to the storage device management table 180 based on the input device ID of the physical LU 331 to search for the entry corresponding to the physical LU 331. The LU management part 140 changes the type 704 of the retrieved entry from "physical" to "virtual".

In a case where it is determined in Step S1301 that the instruction serving as the calling trigger is the generation instruction for the virtual LU 332 for the standby server 200, the LU management part 140 transmits the virtual LU generation request for the standby server 200 to the storage apparatus 300 (Step S1306).

Specifically, the LU management part 140 transmits the virtual LU generation request for the standby server 200 including the value indicating the input capacity of the provided LU to the storage apparatus 300.

The LU management part 140 is in a wait state until the generation completion notification is received from the storage apparatus 300.

After receiving the generation completion notification from the storage apparatus 300, the LU management part 140 generates the mapping change information (Step S1307). Specifically, the following processing is executed.

The LU management part 140 refers to the storage device management table 180 to determine the device ID to be assigned to the generated virtual LU 332 for the standby server 200. Further, the LU management part 140 refers to the path management table 170 to determine the identifier of the host group to be set for the port 305 coupled to the standby server 200.

The LU management part 140 refers to the path management table 170 based on the input identifier of the active server 200 to obtain the device ID of the provided LU.

The LU management part 140 generates the information for changing the mapping destination of the physical LU 331 from the virtual LU 332 for the active server 200 to the virtual LU 332 for the standby server 200 based on the identifier of the active server 200, the device ID of the provided LU, the device ID of the virtual LU 332 for the standby server 200, the identifier of the port 305 coupled to the standby server 200, the identifier of the host group to be set for the port 305, and the WWN of the standby server 200. The generated information is the mapping change information.

The processing of Step S1307 is as described above.

Subsequently, the LU management part 140 transmits the mapping change request including the generated mapping change information to the storage apparatus 300 (Step S1308). The LU management part 140 updates the path management table 170 and the storage device management table 180 (Step S1309), notifies the switching processing part 110 of the completion of the processing, and then brings the processing to an end. Specifically, the following processing is executed.

The LU management part 140 refers to the path management table 170 to search for the entries corresponding to the active server 200 and the standby server 200. It should be noted that the entry corresponding to the standby server 200 is searched for based on the WWN and the identification number of the port 305.

The LU management part 140 deletes the values stored in the host group ID 605 and the device ID 606 of the entry corresponding to the active server 200. The LU management part 140 stores the identifier of the host group determined in Step S1307 in the host group ID 605 of the entry corresponding to the standby server 200. The LU management part 140 stores the device ID of the virtual LU 332 determined in Step S1307 in the device ID 606 of the entry corresponding to the standby server 200.

The LU management part 140 adds the entry of the virtual LU 332 to the storage device management table 180. The device ID 702 of the entry stores the device ID of the virtual LU 332 determined in Step S1307, and the capacity 703 stores the capacity of the provided LU obtained in Step S1306, and the type 704 stores "virtual".

The processing of Step S1309 is as described above.

Figure 14:
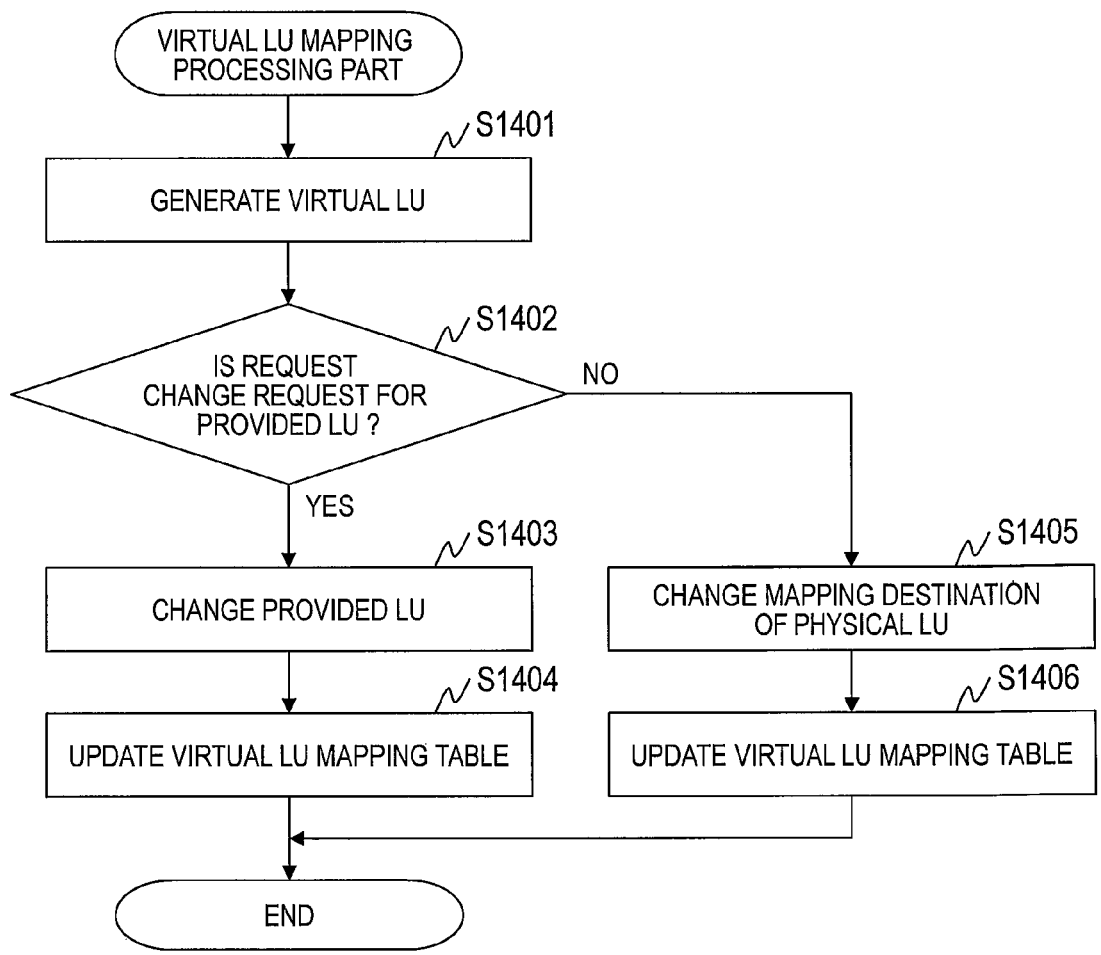
FIG. 14 is a flowchart illustrating processing executed by a virtual LU mapping processing part according to the first embodiment of this invention.

FIG. 14 is a flowchart illustrating processing executed by the virtual LU mapping processing part 310 according to the first embodiment of this invention.

When receiving the virtual LU generation request for the active server 200 or the virtual LU generation request for the standby server 200, the virtual LU mapping processing part 310 starts the processing.

The virtual LU mapping processing part 310 generates the virtual LU 332 based on the received virtual LU generation request (Step S1401).

Specifically, the virtual LU mapping processing part 310 generates the virtual LU 332 having the same capacity as the provided LU based on the capacity of the provided LU included in the virtual LU generation request. The virtual LU mapping processing part 310 notifies that the generation of the virtual LU 332 has been completed. After that, the virtual LU mapping processing part 310 is in a wait state until the request is received from the management server 100.

It should be noted that a known technology may be used as a method of generating the virtual LU 332, and hence a detailed description thereof is omitted.

In a case where the request is received from the management server 100, the virtual LU mapping processing part 310 determines whether or not the received request is the change request for the provided LU (Step S1402).

Specifically, the virtual LU mapping processing part 310 determines whether or not the received request includes the allocation change information. In a case where the received request includes the allocation change information, the virtual LU mapping processing part 310 determines that the received request is the change request for the provided LU. On the other hand, in a case where the received request includes the mapping change information, the virtual LU mapping processing part 310 determines that the received request is the mapping change request.

In a case where it is determined that the received request is the change request for the provided LU, the virtual LU mapping processing part 310 changes the provided LU from the physical LU 331 to the generated virtual LU 332 (Step S1403). Specifically, the following processing is executed.

The virtual LU mapping processing part 310 assigns the device ID currently assigned to the physical LU 331 to the generated virtual LU 332 based on the allocation change information. The virtual LU mapping processing part 310 assigns a new device ID to the physical LU 331 based on the allocation change information. In addition, the virtual LU mapping processing part 310 maps the physical LU 331 to the generated virtual LU 332 based on the allocation change information.

The device ID assigned to the physical LU 331 is assigned to the generated virtual LU 332, which allows the provided LU to be changed from the physical LU 331 to the virtual LU 332 without affecting the active server 200.

The processing of Step S1403 is as described above.

Subsequently, the virtual LU mapping processing part 310 updates the virtual LU mapping table 320 based on a result of changing the provided LU (Step S1404), and brings the processing to an end.

Specifically, the virtual LU mapping processing part 310 adds a new entry to the virtual LU mapping table 320. The physical device ID 801 of the entry stores the device ID of the physical LU 331, and the virtual device ID 802 stores the device ID of the virtual LU 332.

In a case where it is determined in Step S1402 that the received request is the mapping change request, the virtual LU mapping processing part 310 changes the mapping destination of the physical LU 331 from the virtual LU 332 for the active server 200 to the virtual LU 332 for the standby server 200 (Step S1405). Specifically, the following processing is executed.

The virtual LU mapping processing part 310 sets the host group for the port 305 coupled to the standby server 200 based on the mapping change information. More specifically, the virtual LU mapping processing part 310 associates the identifier of the port 305, the identifier of the host group, the device ID of the provided LU, and the WWN of the standby server 200 with one another.

The virtual LU mapping processing part 310 refers to the virtual LU mapping table 320 based on the device ID of the provided LU included in the mapping change information to identify the physical LU 331 to be mapped on the virtual LU 332 for the active server 200. The virtual LU mapping processing part 310 maps the identified physical LU 331 to the virtual LU 332 for the standby server 200.

The processing of Step S1405 is as described above.

Subsequently, the virtual LU mapping processing part 310 updates the virtual LU mapping table 320 based on the result of the mapping change (Step S1406), and brings the processing to an end.

Specifically, the virtual LU mapping processing part 310 refers to the virtual LU mapping table 320 based on the device ID of the provided LU to search for the entry corresponding to the virtual LU 332 for the active server 200. The virtual LU mapping processing part 310 changes the device ID of the virtual LU 332 for the active server 200 stored in the virtual device ID 802 of the retrieved entry to the device ID of the virtual LU 332 for the standby server 200.

According to the first embodiment, it is possible to automatically set the standby server 200 without depending on the coupling of the port 305.

Up to now, the standby server 200 needs to be coupled to the same port as the active server 200. Further, there is a problem in that the information set for the active server 200 and the standby server 200 becomes complicated, in a case where the server 200 coupled to a port different from a port to which the active server 200 is coupled is set as the standby server 200.

However, in the first embodiment, the standby server 200 can be selected without being limited to the port 305 coupled to the active server 200. Therefore, flexibility in operation management thereof is guaranteed, and it is also possible to distribute I/O loads. Further, it is also possible to reduce an influence of a single failure.

MODIFICATION EXAMPLE 1

In the first embodiment, the switching processing part 110 generates the virtual LU 332 without considering the path information on the retrieved standby server 200, but the following processing is also conceivable.

In a case where it is determined in Step S1003 that the candidate server 200 to be the standby server 200 exists, the switching processing part 110 refers to the path management table 170 to obtain the path information on the active server 200 and the standby server 200.

The switching processing part 110 determines based on the obtained information whether or not the port 305 coupled to the active server 200 is the same as the port 305 coupled to the standby server 200.

In a case where it is determined that the port 305 coupled to the active server 200 is the same as the port 305 coupled to the standby server 200, the switching processing part 110 executes normal switching processing, and brings the processing to an end. In other words, the switching processing part 110 sets the WWN assigned to the HBA 205 of the active server 200 for the HBA 205 of the standby server 200.

On the other hand, in a case where it is determined that the port 305 coupled to the active server 200 is not the same as the port 305 coupled to the standby server 200, the switching processing part 110 advances to Step S1005.

By the above-mentioned processing, the normal processing and the processing illustrated in the first embodiment can be switched over for each port 305 coupled to the standby server 200. This can reduce the overhead of the processing.

MODIFICATION EXAMPLE 2

In the first embodiment, the management server 100 determines the device ID of the generated virtual LU 332, but the storage apparatus 300 may determine the device ID of the virtual LU 332.

In this case, in Step S1401, the virtual LU mapping processing part 310 refers to the virtual LU mapping table 320 to determine the device ID of the generated virtual LU 332. Further, the virtual LU mapping processing part 310 notifies the generation of a virtual LU has been completed by including the determined device ID of the virtual LU 332.

In Step S1303, the LU management part 140 generates the allocation change information for assigning the input device ID of the physical LU 331 to the generated virtual LU 332, and for assigning a new device ID determined by the storage apparatus 300 to the physical LU 331.

In Step S1307, the LU management part 140 refers to the path management table 170 to determine the identifier of the host group to be set for the port 305 coupled to the standby server 200.

The LU management part 140 refers to the path management table 170 based on the input identifier of the active server 200 to obtain the device ID of the provided LU. Further, the LU management part 140 obtains the WWN of the standby server 200 from the input path information on the standby server 200.

The LU management part 140 generates the mapping change information for changing the mapping destination of the physical LU 331 from the virtual LU 332 for the active server 200 to the virtual LU 332 for the standby server 200 based on the device ID of the virtual LU 332 determined by the storage apparatus 300, the determined identifier of the host group, the device ID of the provided LU, and the WWN of the standby server 200.

<Second Embodiment>

In a second embodiment of this invention, in advance, the standby server 200 is provided with the virtual LU 332. Specifically, in advance, the management server 100 sets a cold standby group formed of at least one active server 200 and at least one standby server 200. At this time, the management server 100 generates the virtual LU 332 to be provided to the standby server 200.

The following description is mainly directed to a difference from the first embodiment.

Figure 15:
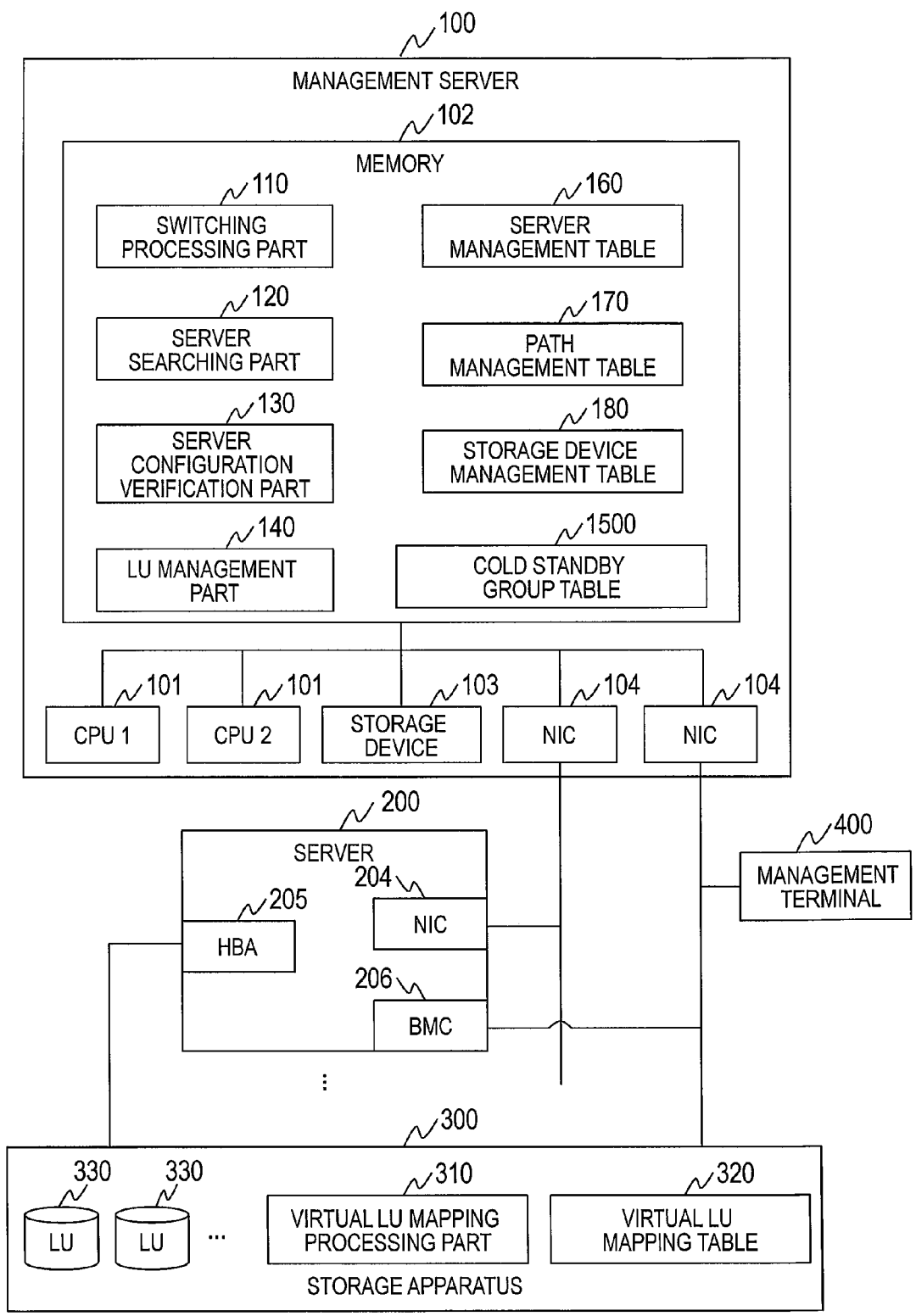
FIG. 15 is a block diagram illustrating a configuration example of a computer system according to a second embodiment of this invention.

FIG. 15 is a block diagram illustrating a configuration example of a computer system according to the second embodiment of this invention.

The second embodiment is different in that the management server 100 includes a cold standby group table 1500. The other components are the same as those of the first embodiment, and hence descriptions thereof are omitted.

The cold standby group table 1500 stores the information for managing the cold standby group.

FIG. 16 is an explanatory diagram illustrating an example of the cold standby group table 1500 according to the second embodiment of this invention.

The cold standby group table 1500 includes a cold standby group ID 1601, an active server ID 1602, and a standby server ID 1603.

The cold standby group ID 1601 stores an identifier for uniquely identifying the cold standby group. The active server ID 1602 stores the identifier of the active server 200 included in the cold standby group. The standby server ID 1603 stores the identifier of the standby server 200 included in the cold standby group.

It should be noted that, in the example shown in FIG. 16, one cold standby group includes one standby server 200, but may include at least two standby servers 200.

Figure 17A:
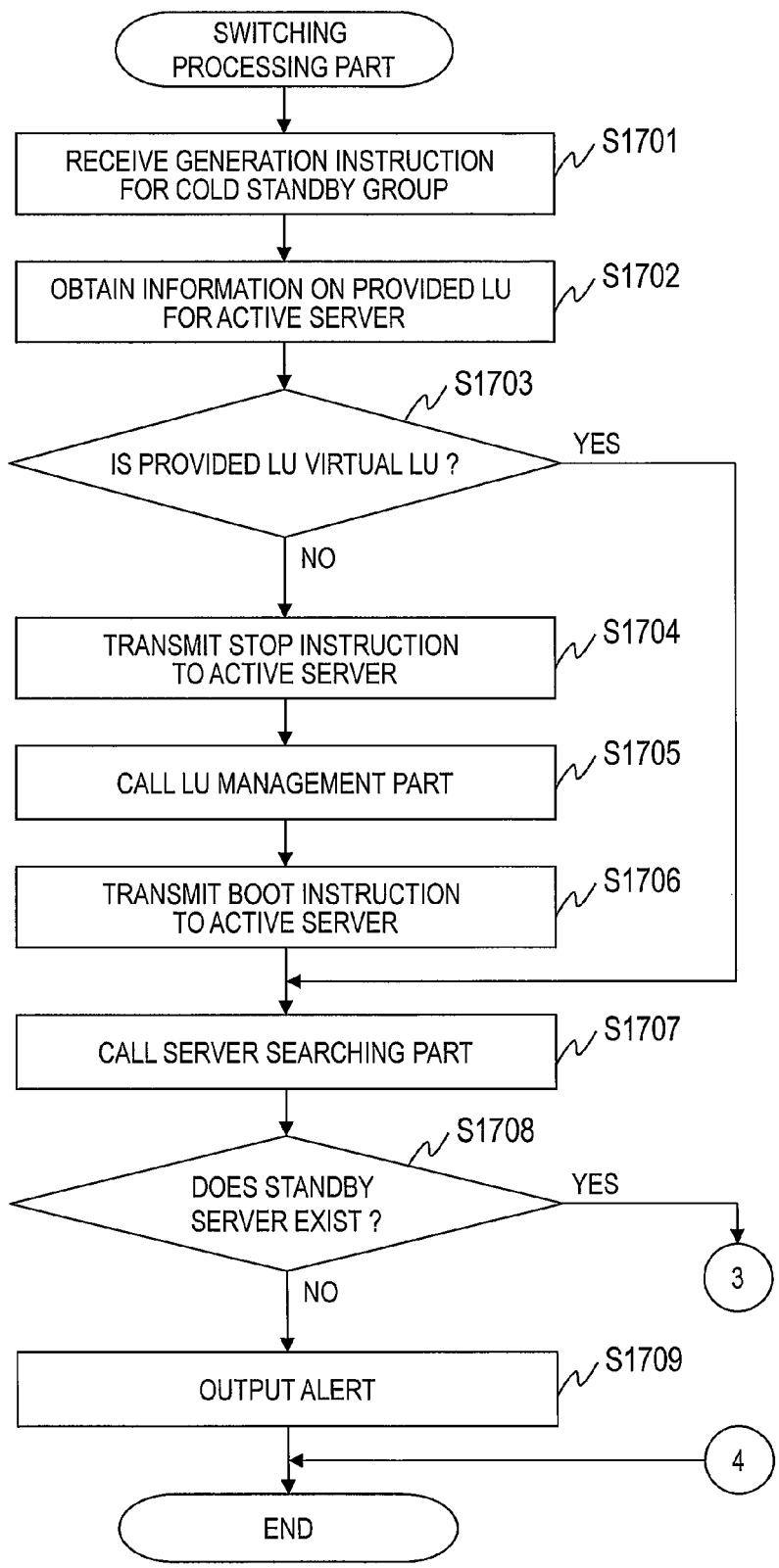
FIG. 17A and FIG. 17B are flowcharts illustrating registration processing executed to set a cold standby group by the switching processing part according to the second embodiment of this invention.
Figure 17B:
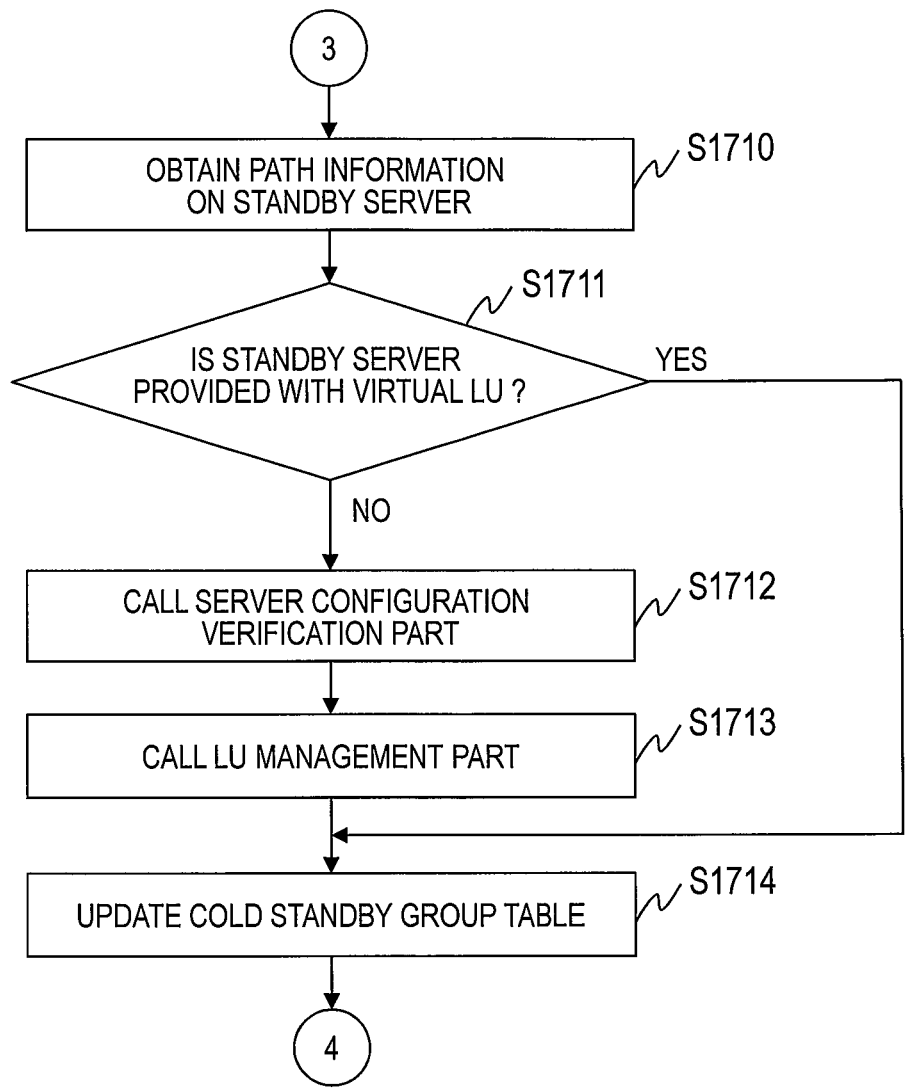

FIG. 17A and FIG. 17B are flowcharts illustrating registration processing executed to set the cold standby group by the switching processing part 110 according to the second embodiment of this invention.

The management server 100 starts the following registration processing when receiving generation instruction for registering the cold standby group from the management terminal 400.

The switching processing part 110 receives the generation instruction for the cold standby group (Step S1701). The generation instruction includes an identifier of the cold standby group, and the identifier of the active server 200 to be added to the cold standby group. Further, the generation instruction includes the number of standby servers 200 to be added to the cold standby group:

It should be noted that, in a case where the generation instruction includes the identifiers of a plurality of active servers 200, the processing of Step S1702 to Step S1713 are executed for each of the active servers 200.

The switching processing part 110 obtains the information relating to the provided LU for the active server 200 to be added to the cold standby group (Step S1702). Specifically, the following processing is executed.

The switching processing part 110 refers to the path management table 170 based on the identifier of the active server 200 included in the generation instruction to search for the entry corresponding to the active server 200 to be added.

The switching processing part 110 obtains the device ID of the provided LU from the device ID 606 of the retrieved entry. The switching processing part 110 refers to the storage device management table 180 based on the obtained device ID of the provided LU to search for the entry corresponding to the provided LU.

The processing of Step S1702 is as described above.

The switching processing part 110 determines whether or not the provided LU is the virtual LU 332 (Step S1703).

Specifically, the switching processing part 110 determines whether or not the type 704 of the entry corresponding to the provided LU, which has been retrieved in Step S1702, is "virtual". In a case where the type 704 is "virtual", the switching processing part 110 determines that the provided LU is the virtual LU 332.

In a case where it is determined that the provided LU is the virtual LU 332, the switching processing part 110 advances to Step S1707.

In a case where it is determined that the provided LU is not the virtual LU 332, the switching processing part 110 transmits the stop instruction to the active server 200 (Step S1704) and calls the LU management part 140 (Step S1705). At this time, the switching processing part 110 inputs the identifier of the active server 200 and the device ID of the provided LU to the LU management part 140.

The switching processing part 110 is in a wait state until notified by the LU management part 140 of processing completion. At this time, the LU management part 140 executes the processing of Step S1301 to Step S1305 illustrated in FIG. 13.

After receiving the notification of the processing completion from the LU management part 140, the switching processing part 110 transmits the boot instruction to the active server 200 (Step S1706).

The switching processing part 110 calls the server searching part 120 (Step S1707). At this time, the switching processing part 110 inputs the identifier of the active server 200 and the number of standby servers 200 to the server searching part 120.

It should be noted that the called server searching part 120 searches the candidate servers 200 for the standby server 200 in accordance with the processing illustrated in FIG. 11. In the second embodiment, in Step S1102, the server searching part 120 searches for as many standby servers 200 as the input number of standby servers 200. The other processing is the same as that of the first embodiment, and hence a description thereof is omitted.

The switching processing part 110 determines whether or not the candidate server 200 to be the standby server 200 exists based on the processing result output from the server searching part 120 (Step S1708).

In this embodiment, in a case where the processing result includes the identifiers of as many candidate servers 200 as the number of standby servers 200, it is determined that the candidate server 200 to be the standby server 200 exists.

In a case where it is determined that the candidate server 200 to be the standby server 200 does not exist, the switching processing part 110 outputs an alert to the administrator (Step S1709), and brings the processing to an end.

In a case where it is determined that the candidate server 200 to be the standby server 200 exists, the switching processing part 110 obtains the path information on the standby server 200 (Step S1710). Specifically, the following processing is executed.

The switching processing part 110 refers to the path management table 170 based on the output identifier of the standby server 200 to search for the entry corresponding to the standby server 200.

The switching processing part 110 obtains the value stored in the device ID 606 of the retrieved entry. In other words, the device ID of the LU 330 to be provided to the standby server 200 is obtained.

The switching processing part 110 refers to the storage device management table 180 based on the obtained device ID of the virtual LU 332 for the standby server 200 to search for the entry corresponding to the virtual LU 332 for the standby server 200.

It should be noted that, in a case where the processing result includes the identifiers of a plurality of standby servers 200, the switching processing part 110 executes the above-mentioned processing for each of the identifiers of the standby servers 200.

The processing of Step S1710 is as described above.

The switching processing part 110 determines whether or not the standby server 200 is provided with the virtual LU 332 based on the obtained path information on the standby server 200 (Step S1711). Specifically, the following processing is executed.

The switching processing part 110 determines whether or not the type 704 of the entry retrieved in Step S1710 is "virtual". In a case where it is determined that the type 704 of the retrieved entry is "virtual", the switching processing part 110 determines that the standby server 200 is provided with the virtual LU 332.

In a case where it is determined that the standby server 200 is provided with the virtual LU 332, the switching processing part 110 advances to Step S1714.

In a case where it is determined that the standby server 200 is not provided with the virtual LU 332, the switching processing part 110 calls the server configuration verification part 130 (Step S1712). At this time, the switching processing part 110 inputs the identifier of the active server 200 and the identifier of the standby server 200 to the server configuration verification part 130.

The switching processing part 110 is in a wait state until a processing result is output from the server configuration verification part 130. It should be noted that processing executed by the server configuration verification part 130 is described later in detail with reference to FIG. 18.

The switching processing part 110 calls the LU management part 140 in order to generate the virtual LU 332 to be provided to the standby server 200 (Step S1713). At this time, the switching processing part 110 is in a wait state until the processing completion is notified of by the LU management part 140. The called LU management part 140 executes the processing of Step S1306 illustrated in FIG. 13. It should be noted that there is no need to change the mapping, and hence the processing of Step S1307 to Step S1309 is not executed.

After receiving the notification of the processing completion from the LU management part 140, the switching processing part 110 updates the cold standby group table 1500 (Step S1714), and brings the processing to an end. Specifically, the following processing is executed.

The switching processing part 110 refers to the cold standby group table 1500 based on the input identifier of the cold standby group to search for the entry corresponding to the cold standby group.

In a case where the corresponding entry exists, the switching processing part 110 adds the input identifier of the active server 200 to the active server ID 1602 of the corresponding entry. Further, the switching processing part 110 adds the identifier of the retrieved standby server 200 to the standby server ID 1603 of the corresponding entry.

On the other hand, in a case where the corresponding entry does not exist, the switching processing part 110 newly generates an entry, and stores the identifier of the cold standby group input in the cold standby group ID 1601 of the generated entry. The switching processing part 110 stores the input identifier of the active server 200 in the active server ID 1602 of the added entry. Further, the switching processing part 110 stores the identifier of the retrieved standby server 200 in the standby server ID 1603 of the added entry.

The processing of Step S1714 is as described above.

Figure 18:
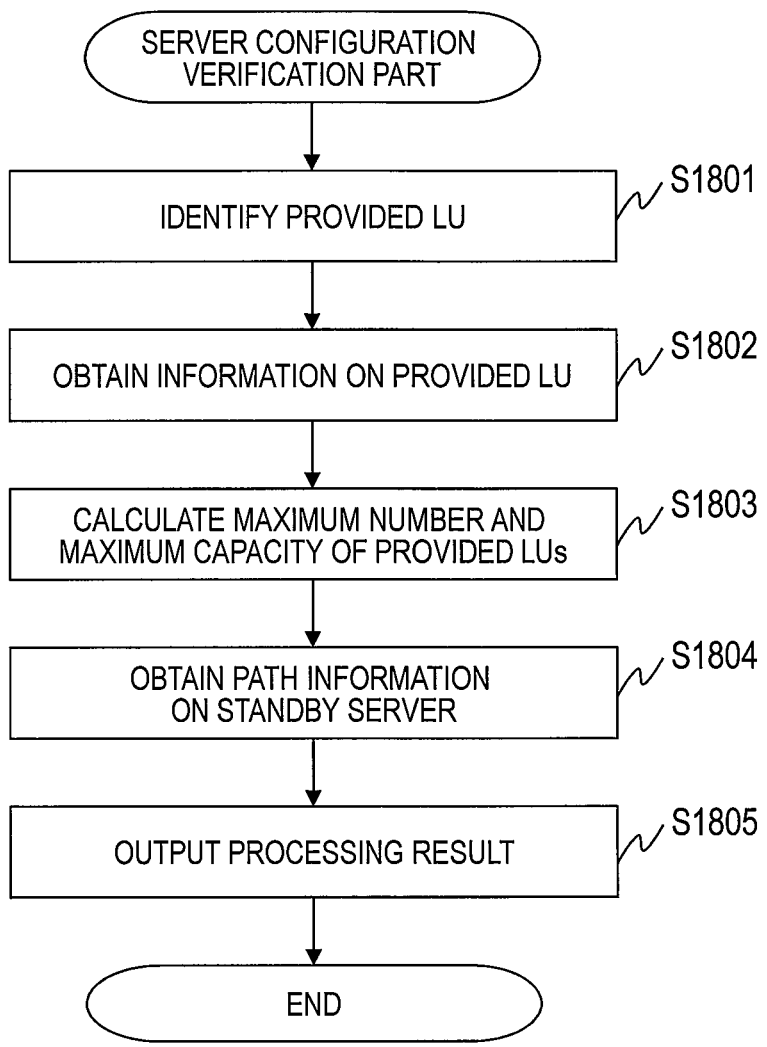
FIG. 18 is a flowchart illustrating processing executed when the cold standby group is generated by the server configuration verification part according to the second embodiment of this invention.

FIG. 18 is a flowchart illustrating processing executed when the cold standby group is generated by the server configuration verification part 130 according to the second embodiment of this invention.

The server configuration verification part 130 starts the processing when called by the switching processing part 110. It should be noted that the identifier of the active server 200 and the identifier of the standby server 200 are input to the server configuration verification part 130.

The server configuration verification part 130 refers to the path management table 170 to identify the provided LU for the active server 200 (Step S1801).

The processing of Step S1801 is the same processing as the processing of Step S1201.

The server configuration verification part 130 refers to the storage device management table 180 to obtain the information on the identified provided LU (Step S1802).

The processing of Step S1802 is the same processing as the processing of Step S1202.

It should be noted that, in a case where the identifiers of a plurality of active servers 200 are input, the processing of Step S1801 and Step S1802 is executed for each of the active servers 200.

The server configuration verification part 130 calculates the maximum number of provided LUs for the active server 200 included in the cold standby group and a maximum capacity of the provided LU for the active server 200 included in the cold standby group (Step S1803).

In the examples shown in FIG. 6 and FIG. 7, in a case where the identifiers "S1" and "S2" are input to the active server, the maximum number of provided LUs is calculated as "4", and the maximum capacity of the provided LU is calculated as "10 GB".

The server configuration verification part 130 refers to the path management table 170 to obtain the path information on the standby server 200 (Step S1804).

Specifically, the server configuration verification part 130 refers to the path management table 170 based on the input identifier of the standby server 200 to search for the entry corresponding to the standby server 200. The server configuration verification part 130 obtains the values stored in the HBA 602 and port number 604 of the retrieved entry.

The server configuration verification part 130 outputs the processing result including the obtained information to the switching processing part 110 (Step S1805), and brings the processing to an end.

The processing result includes the maximum number of provided LUs, the maximum capacity of the provided LU, the WWN of the standby server 200, and the identifier of the port 305 coupled to the standby server 200.

Here, a description is made of processing executed to generate the cold standby group by the LU management part 140 and the virtual LU mapping processing part 310.

The LU management part 140 executes the processing illustrated in FIG. 13 when called by the switching processing part 110 to generate the cold standby group. However, processing content of the following steps is different.

In Step S1306, the LU management part 140 transmits, to the storage apparatus 300, the virtual LU generation request for the standby server 200 including the maximum number of provided LUs, the maximum capacity of the provided LU, the WWN of the standby server 200, and the standby server 200.

In Step S1307, the LU management part 140 generates mapping update information instead of the mapping change information. The mapping update information includes the device ID to be assigned to the generated virtual LU 332 for the standby server 200.

In Step S1308, the LU management part 140 transmits an update request for the virtual LU mapping table 320 including the mapping update information.

In Step S1309, the LU management part 140 updates the path management table 170 and the storage device management table 180 as follows.

The LU management part 140 refers to the path management table 170 to search for the entry corresponding to the standby server 200. The LU management part 140 stores the identifier of the host group determined in Step S1307 in the host group ID 605 of the entry corresponding to the standby server 200.

The LU management part 140 stores the device ID of the virtual LU 332 determined in Step S1307 in the device ID 606 of the entry corresponding to the standby server 200.

The LU management part 140 adds the entry of the virtual LU 332 for the standby server 200 to the storage device management table 180. In the entry, the device ID 702 stores the device ID of the virtual LU 332 determined in Step S1307, the capacity 703 stores the capacity of the provided LU obtained in Step S1306, and the type 704 stores "virtual".

The processing of Step S1309 is as described above.

Next, a description is made of processing executed by the virtual LU mapping processing part 310.

The virtual LU mapping processing part 310 executes the processing of Step S1401 to Step S1404 and Step S1406 illustrated in FIG. 14 when called by the LU management part 140 to generate the cold standby group.

In Step S1406, the entry of the virtual LU 332 for the standby server 200 is added to the virtual LU mapping table 320. The virtual device ID 802 of the entry stores the device ID of the virtual LU 332 included in LU mapping update information.

Further, the failover processing according to the second embodiment is partially different from the failover processing according to the first embodiment.

The processing of the switching processing part 110 is different in the following points.

In Step S1001, the switching processing part 110 refers to the cold standby group table 1500 to determine whether or not the active server 200 in which a failure has occurred is included in the cold standby group.

In a case where the active server 200 in which a failure has occurred is included in the cold standby group, the switching processing part 110 selects one identifier stored in the standby server ID 1603, and then advances to Step S1005.

On the other hand, in a case where the active server 200 in which a failure has occurred is not included in the cold standby group, the switching processing part 110 advances to Step S1002.

Further, in Step S1008, in a case where the notification that there is no need to change the virtual LU 332 is output from the server configuration verification part 130, the switching processing part 110 inputs a mapping change instruction to the LU management part 140.

Figure 19:
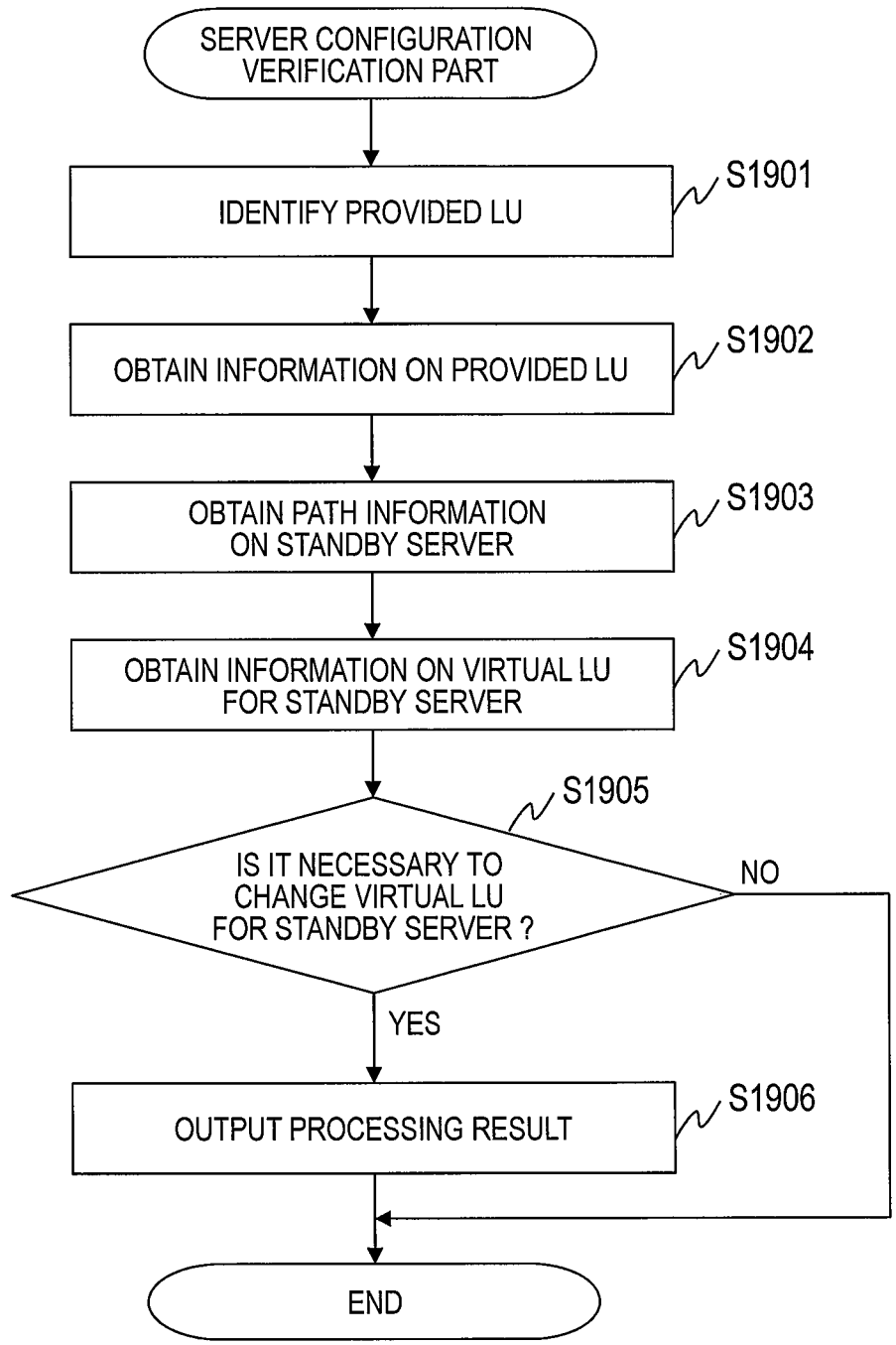
FIG. 19 is a flowchart illustrating processing executed, when the failover processing is executed, by the server configuration verification part according to the second embodiment of this invention.

FIG. 19 is a flowchart illustrating processing executed, when the failover processing is executed, by the server configuration verification part 130 according to the second embodiment of this invention.

The server configuration verification part 130 starts the processing when called by the switching processing part 110. It should be noted that the identifier of the active server 200 and the identifier of the standby server 200 are input to the server configuration verification part 130.

The server configuration verification part 130 refers to the path management table 170 to identify the provided LU 330 (Step S1901). It should be noted that, the processing of Step S1901 is the same processing as the processing of Step S1101.

The server configuration verification part 130 refers to the storage device management table 180 to obtain the information on the identified provided LU (Step S1902). It should be noted that the processing of Step S1902 is the same processing as the processing of Step S1102.

The server configuration verification part 130 refers to the path management table 170 to obtain the path information on the standby server 200 (Step S1903).

Specifically, the server configuration verification part 130 refers to the path management table 170 based on the input identifier of the standby server 200 to search for the entry corresponding to the standby server 200. The server configuration verification part 130 obtains the device ID of the virtual LU 332 for the standby server 200 from the device ID 606 of the retrieved entry.

The server configuration verification part 130 refers to the storage device management table 180 to obtain the information on the virtual LU 332 for the standby server 200 (Step S1904).

Specifically, the server configuration verification part 130 refers to the storage device management table 180 based on the obtained device ID of the virtual LU 332 to search for the entry corresponding to the virtual LU 332. The server configuration verification part 130 obtains a value stored in the capacity 703 of the retrieved entry.

The server configuration verification part 130 determines whether or not it is necessary to change the virtual LU 332 for the standby server 200 (Step S1905). Specifically, the server configuration verification part 130 determines whether or not the number of provided LUs and the number of virtual LUs 332 match each other and whether or not the capacity of each of the provided LUs and the capacity of each of the virtual LUs 332 match each other. In a case where any one of the conditions is not satisfied, the server configuration verification part 130 determines that it is necessary to change the virtual LU 332 for the standby server 200.

In a case where it is determined that there is no need to change the virtual LU 332 for the standby server 200, the server configuration verification part 130 outputs the notification that there is no need to change the virtual LU 332, and brings the processing to an end.

In a case where it is determined that it is necessary to change the virtual LU 332 for the standby server 200, the server configuration verification part 130 outputs the processing result including the obtained information to the switching processing part 110 (Step S1906), and brings the processing to an end. It should be noted that the processing of Step S1906 is the same processing as the processing of Step S1204.

Figure 20:
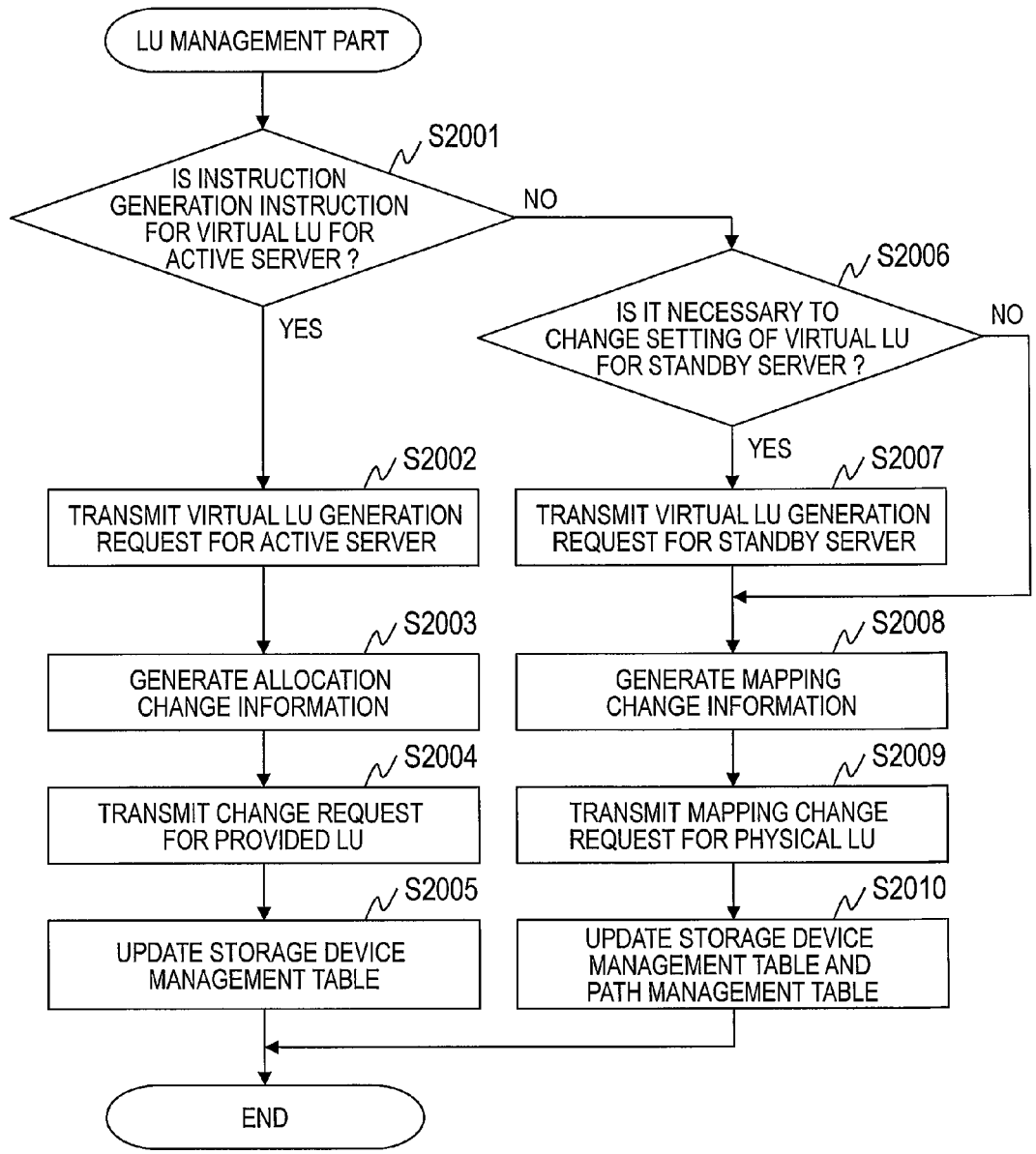
FIG. 20 is a flowchart illustrating the processing executed, when the failover processing is executed, by the LU management part according to the second embodiment of this invention.

FIG. 20 is a flowchart illustrating the processing executed, when the failover processing is executed, by the LU management part 140 according to the second embodiment of this invention at a time of the failover.

The processing of Step S2001 to Step S2005 is the same processing as the processing of Step S1301 to Step S1305. It should be noted that, in the second embodiment, the virtual LU 332 is provided to the active server 200 included in the cold standby group, and hence the processing of Step S2001 to Step S2005 is not executed.

In a case where it is determined in Step S1301 that the instruction serving as the calling trigger is the generation instruction for the virtual LU 332 for the standby server 200, the LU management part 140 determines whether or not it is necessary to generate the virtual LU 332 for the standby server 200 (Step S2006).

Specifically, the LU management part 140 determines whether or not the mapping change instruction has been input from the switching processing part 110. In a case where the mapping change instruction is input from the switching processing part 110, the LU management part 140 determines that there is no need to generate the virtual LU 332 for the standby server 200. This is because an appropriate virtual LU 332 for the standby server 200 has already been generated.

In a case where it is determined that there is no need to generate the virtual LU for the standby server 200, the LU management part 140 advances to Step S2008. In this case, in Step S2008, the mapping change information for changing the mapping destination of the physical LU 331 from the virtual LU 332 for the active server 200 to the virtual LU 332 for the standby server 200 is generated.

In a case where it is determined that it is necessary to generate the virtual LU for the standby server 200, the LU management part 140 advances to Step S2007. The processing of Step S2007 is the same processing as the processing of Step S1306.

The processing of Step S2008 to Step S2010 is the same processing as the processing of Step S1307 to Step S1309.

According to the second embodiment of this invention, the standby server 200 is provided with the virtual LU 332 in advance when the cold standby group is generated, which can reduce the overhead at the time of the failover processing.

<Third Embodiment>

In a third embodiment of this invention, a timing to change the mapping of the physical LU 331 is different. Specifically, the mapping of the physical LU 331 is changed based on a timing designated by the administrator or the user. The following description of the third embodiment is mainly directed to a difference from the first embodiment of this invention.

A computer system according to the third embodiment of this invention has the same configuration as in the first embodiment, and hence a description thereof is omitted. In the third embodiment, a trigger that causes the switching processing part 110 to execute the processing is different. The other components are the same as those of the first embodiment of this invention, and hence descriptions thereof are omitted.

In the third embodiment, in accordance with a switch instruction, the switching processing part 110 changes the mapping destination of the physical LU 331 used by the active server 200 from the virtual LU 332 for the active server 200 to the virtual LU 332 for the standby server 200.

Figure 21:
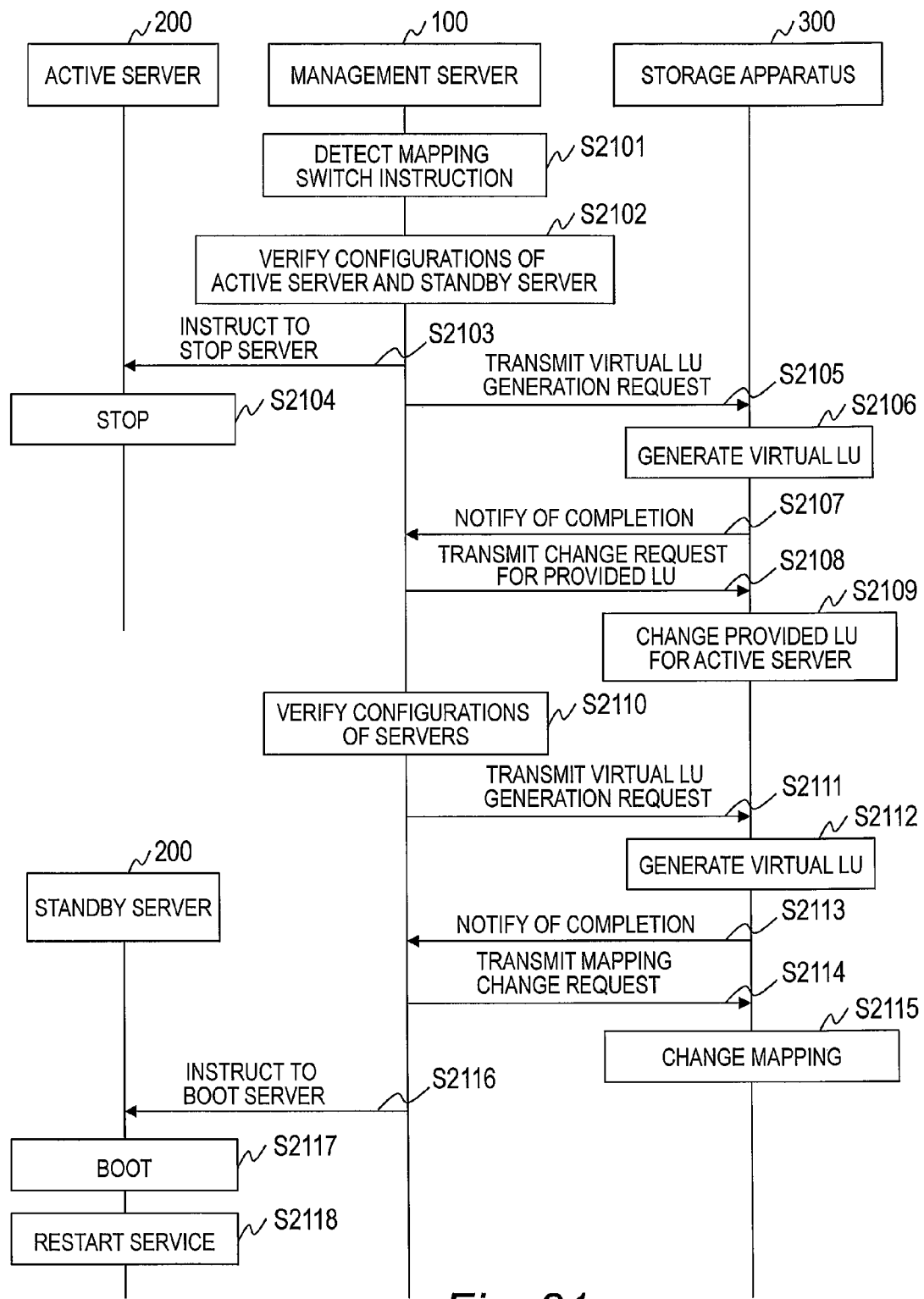
FIG. 21 is a sequence diagram illustrating a procedure for switching processing according to a third embodiment of this invention.

FIG. 21 is a sequence diagram illustrating a procedure for the switching processing according to the third embodiment of this invention.

The switching processing part 110 starts the processing in a case of detecting the mapping switch instruction transmitted from the management terminal 400 (Step S2101).

Figure 22:
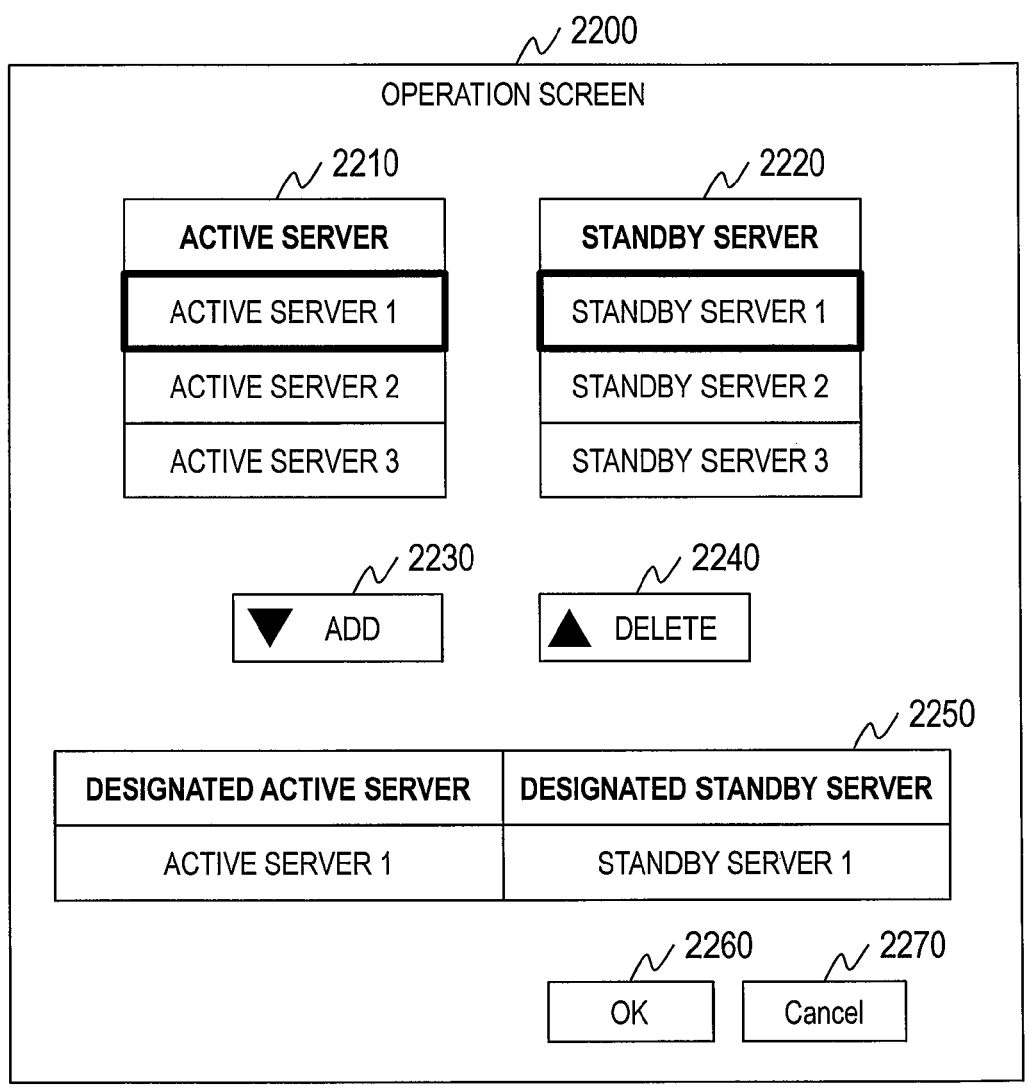
FIG. 22 is an explanatory diagram illustrating an example of an operation screen according to the third embodiment of this invention.

In this embodiment, an instruction for switching of the mapping is given by using an operation screen as illustrated in FIG. 22.

FIG. 22 is an explanatory diagram illustrating an example of an operation screen according to the third embodiment of this invention.

An operation screen 2200 includes an active server selection area 2210, a standby server selection area 2220, an add button 2230, a delete button 2240, a switching target display area 2250, an OK button 2260, and a cancel button 2270.

The active server selection area 2210 is an area for selecting the active server 200 to be subjected to the switching processing. In this embodiment, when the administrator or the like selects an entry of the active server 200 displayed in the active server selection area 2210, the selected entry is highlighted.

The standby server selection area 2220 is an area for selecting the standby server 200 to be subjected to the switching processing. In this embodiment, when the administrator or the like selects an entry of the standby server 200 displayed in the standby server selection area 2220, the selected entry is highlighted.

The switching target display area 2250 is an area for displaying a pair of the active server 200 and the standby server 200 as a switching target.

The add button 2230 is a button for adding, as subjects to be processed, the pair of the active server 200 and the standby server 200 selected in the active server selection area 2210 and the standby server selection area 2220. When the administrator or the like operates the add button 2230, the pair of the active server 200 and the standby server 200 selected in the switching target display area 2250 is displayed.

The delete button 2240 is a button for deleting the pair of the active server 200 and the standby server 200 added as the switching target.

The OK button 2260 is a button for giving an instruction for the switching processing. The cancel button 2270 is a button for canceling the execution of the switching processing.

Therefore, the mapping switch instruction includes the identifier of the active server 200 and the identifier of the standby server 200.

Returning to FIG. 21, the description is continued.

The management server 100 verifies the configurations of the active server 200 and the standby server 200 (Step S2102).

The management server 100 transmits the stop instruction to the active server 200 (Step S2103).

In a case of receiving the stop instruction, the active server 200 stops the active server 200 itself (Step S2104).

The management server 100 transmits the virtual LU generation request for the active server 200 to the storage apparatus 300 (Step S2105).

In a case of receiving the virtual LU generation request for the active server 200, the storage apparatus 300 generates the virtual LU 332 based on the request (Step S2106), and transmits the first generation completion notification to the management server 100 (Step S2107).

After receiving the first generation completion notification, the management server 100 transmits the change request for the provided LU to the storage apparatus 300 (Step S2108).

In a case of receiving the change request for the provided LU, the storage apparatus 300 provides the active server 200 with the virtual LU 332, and maps the physical LU 331 to the virtual LU 332 (Step S2109).

The management server 100 verifies the configurations of the active server 200 and the standby server 200 (Step S2110), and transmits the virtual LU generation request for the standby server 200 (Step S2111).

In a case of receiving the virtual LU generation request for the standby server 200, the storage apparatus 300 generates the virtual LU 332 based on the request (Step S2112), and transmits the second generation completion notification to the management server 100 (Step S2113).

After receiving the second generation completion notification, the management server 100 transmits the mapping change request in order to change the mapping relationship between the physical LU 331 and the virtual LU 332 (Step S2114).

In a case of receiving the mapping change request, the storage apparatus 300 changes the virtual LU 332 to which the physical LU 331 is mapped (Step S2115).

After that, the management server 100 transmits the boot instruction to the standby server 200 (Step S2116).

In a case of receiving the boot instruction, the standby server 200 boots the standby server 200 (Step S2117), and restarts the service as a new active server 200 (Step S2118).

It should be noted that the processing of Step S2105 to Step S2118 is the same processing as the processing of Step S907 to Step S920.

Figure 23A:
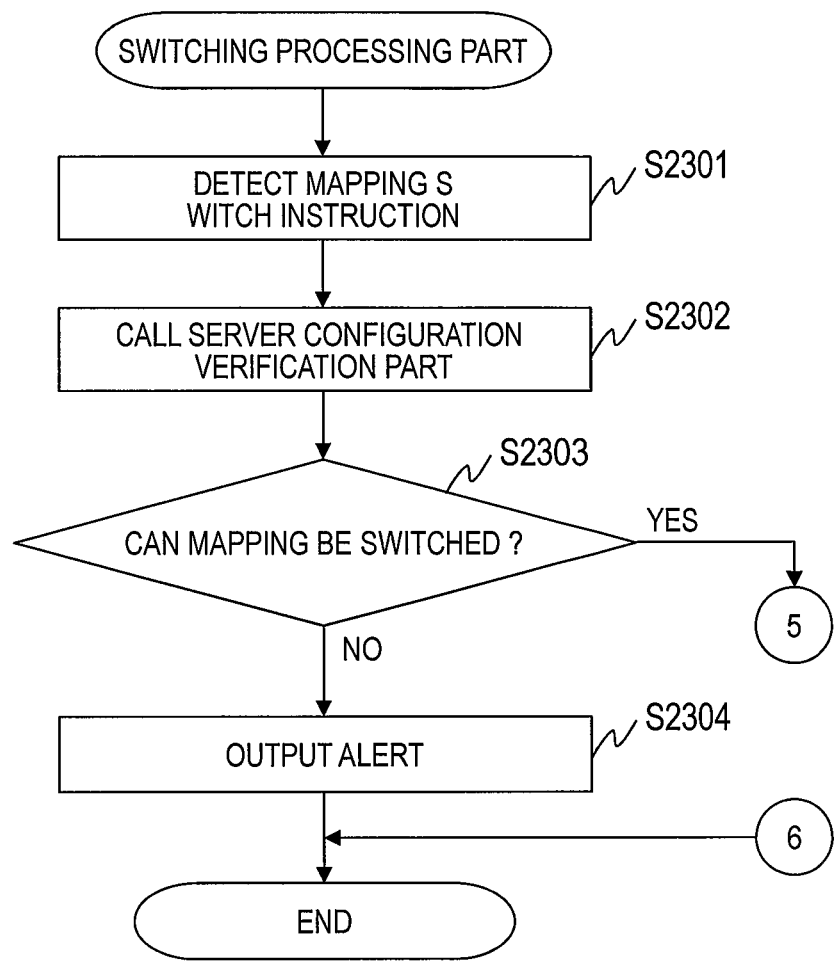
FIG. 23A and FIG. 23B are flowcharts illustrating processing executed by the switching processing part according to the third embodiment of this invention.
Figure 23B:
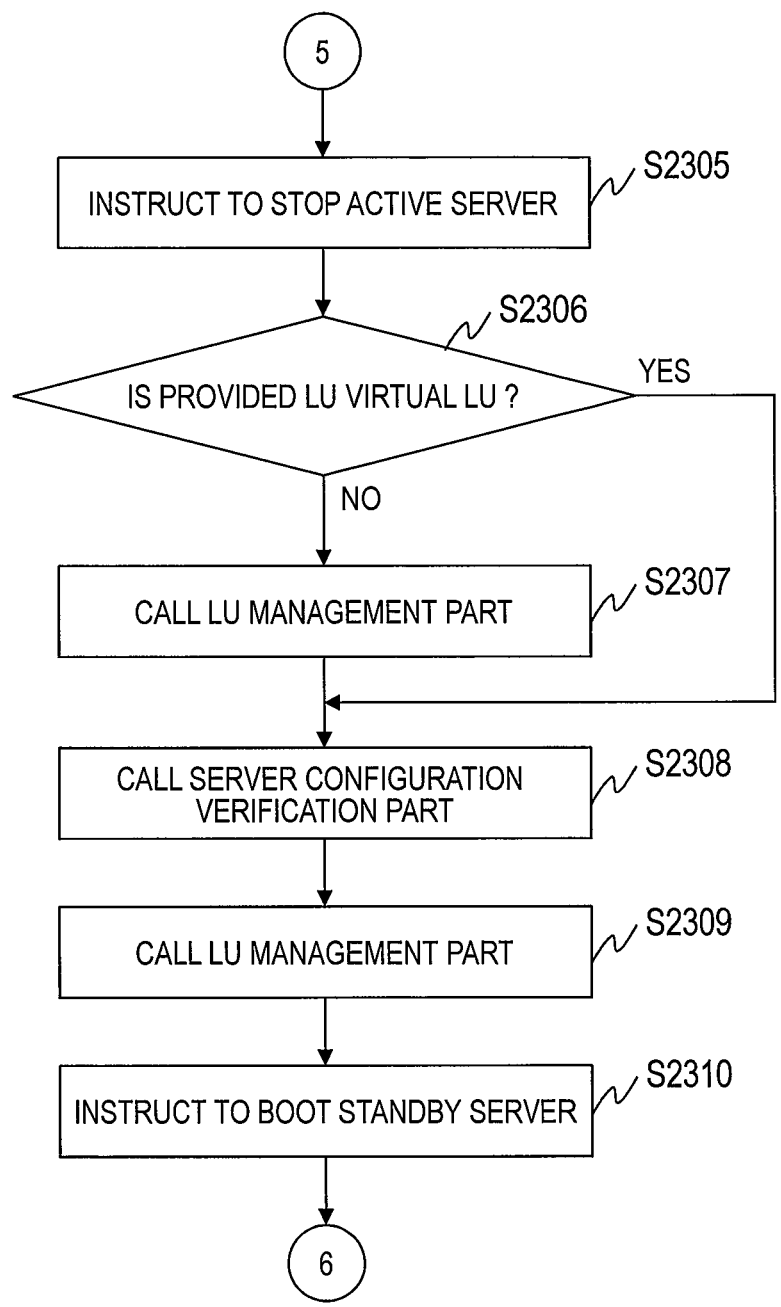

FIG. 23A and FIG. 23B are flowcharts illustrating processing executed by the switching processing part 110 according to the third embodiment of this invention.

The switching processing part 110 detects the switch instruction transmitted from the management terminal 400 (Step S2301).

The switching processing part 110 calls the server configuration verification part 130 (Step S2302). At this time, the switching processing part 110 inputs, to the server configuration verification part 130, the identifier of the active server 200 and the identifier of the standby server 200 that are included in the mapping switch instruction. In addition, the switching processing part 110 inputs a configuration verification instruction. The configuration verification instruction is information for distinguishing from the calling at a time of generating the virtual LU 332 for the standby server 200.

The switching processing part 110 is in a wait state until the processing result is output from the server configuration verification part 130. It should be noted that the processing executed by the server configuration verification part 130 is described later in detail with reference to FIG. 24A and FIG. 24B.

The switching processing part 110 determines whether or not the mapping of the physical LU 331 can be switched based on the processing result output from the server configuration verification part 130 (Step S2303).

Specifically, the switching processing part 110 determines whether or not the processing result is the determination result indicating that the mapping of the physical LU 331 can be switched. In a case where the processing result is the determination result indicating that the mapping of the physical LU 331 can be switched, the switching processing part 110 determines that the mapping of the physical LU 331 can be switched.

In a case where it is determined that the mapping of the physical LU 331 cannot be switched, the switching processing part 110 outputs an alert to the administrator (Step S2304), and brings the processing to an end.

In a case where it is determined that the mapping of the physical LU 331 can be switched, the switching processing part 110 transmits the stop instruction to the active server 200 (Step S2305).

The switching processing part 110 refers to the path management table 170 and the storage device management table 180 to determine whether or not the provided LU is the virtual LU 332 (Step S2306). The processing of Step S2306 is the same processing as that of Step S1006.

In a case where it is determined that the provided LU is the virtual LU 332, the switching processing part 110 advances to Step S2308.

In a case where it is determined that the provided LU is not the virtual LU 332, the switching processing part 110 calls the LU management part 140 in order to generate the virtual LU 332 to be provided to the active server 200 (Step S2307).

The switching processing part 110 is in a wait state until the processing completion is notified of by the LU management part 140. It should be noted that the processing executed by the LU management part 140 is the same processing as that of the first embodiment, and hence a description thereof is omitted.

After receiving the notification of the processing completion from the LU management part 140, the switching processing part 110 calls the server configuration verification part 130 (Step S2308).

The switching processing part 110 is in a wait state until the processing result is notified of by the server configuration verification part 130. It should be noted that the processing executed by the server configuration verification part 130 is described later in detail with reference to FIG. 24A and FIG. 24B.

The switching processing part 110 calls the LU management part 140 in order to generate the virtual LU 332 to be provided to the standby server 200 (Step S2309).

The switching processing part 110 is in a wait state until the processing completion is notified of by the LU management part 140. It should be noted that the processing executed by the LU management part 140 is the same processing as that of the first embodiment, and hence a description thereof is omitted.

After receiving the notification of the processing completion from the LU management part 140, the switching processing part 110 transmits the boot instruction to the standby server 200 (Step S2310), and brings the processing to an end.

It should be noted that the processing of Step S2307 to Step S2310 is the same processing as the processing of Step S1007 to Step S1010.

Figure 24A:
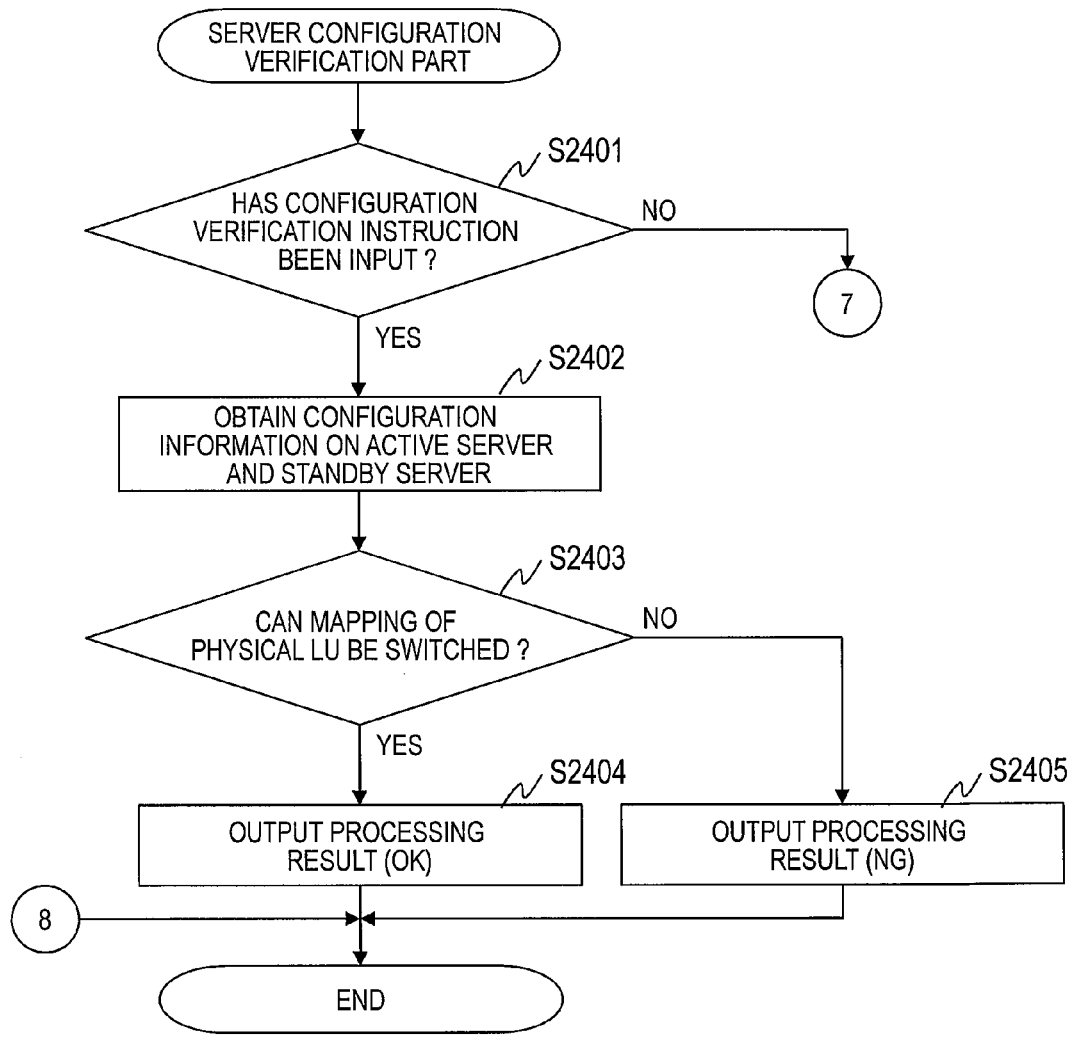
FIG. 24A and FIG. 24B are flowcharts illustrating processing executed by the server configuration verification part according to the third embodiment of this invention.
Figure 24B:
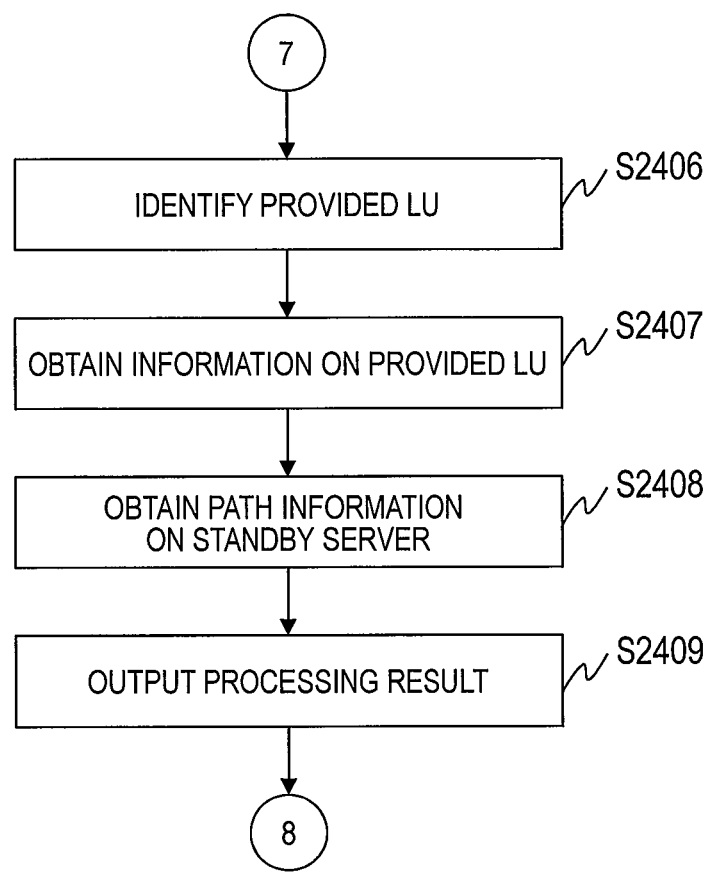

FIG. 24A and FIG. 24B are flowcharts illustrating processing executed by the server configuration verification part 130 according to the third embodiment of this invention.

The server configuration verification part 130 starts the processing when called by the switching processing part 110. It should be noted that the identifier of the active server 200 and the identifier of the standby server 200 are input to the server configuration verification part 130.

The server configuration verification part 130 determines whether or not the configuration verification instruction has been input (Step S2401).

In a case where it is determined that the configuration verification instruction has been input, the server configuration verification part 130 refers to the server management table 160 to obtain the configuration information on the active server 200 and the standby server 200 to be processed (Step S2402).

Specifically, the server configuration verification part 130 refers to the server management table 160 based on the input identifier of the active server 200 to search for the entry corresponding to the active server 200. Further, the server configuration verification part 130 refers to the server management table 160 based on the input identifier of the standby server 200 to search for the entry corresponding to the standby server 200.

The server configuration verification part 130 determines whether or not the mapping of the physical LU 331 can be switched from the virtual LU 332 for the active server 200 to the virtual LU 332 for the standby server 200 (Step S2403).

Specifically, the server configuration verification part 130 compares the configuration information on the active server 200 and the configuration information on the standby server 200 that have been obtained in Step S2402 with each other, and determines whether or not the hardware configuration of the standby server 200 is the same as that of the active server 200. In a case where the hardware configuration of the standby server 200 is the same as that of the active server 200, the server configuration verification part 130 determines that the mapping of the physical LU 331 can be switched.

In a case where it is determined that the mapping of the physical LU 331 can be switched, the server configuration verification part 130 outputs the processing result indicating that the mapping of the physical LU 331 can be switched (Step S2404), and brings the processing to an end.

In a case where it is determined that the mapping of the physical LU 331 cannot be switched, the server configuration verification part 130 outputs the processing result indicating that the mapping of the physical LU 331 cannot be switched (Step S2405), and brings the processing to an end.

In Step S2401, in a case where it is determined that the configuration verification instruction has not been input, the server configuration verification part 130 refers to the path management table 170 to identify the provided LU (Step S2406). The server configuration verification part 130 refers to the storage device management table 180 to obtain the information on the identified provided LU (Step S2407). The server configuration verification part 130 refers to the path management table 170 to obtain the path information on the standby server 200 (Step S2408). The server configuration verification part 130 outputs the processing result including the obtained information to the switching processing part 110 (Step S2409), and brings the processing to an end.

The processing of Step S2406 to Step S2409 is the same processing as the processing of Step S1201 to Step S1204.

According to the third embodiment of this invention, it is possible to switch the mapping destination of the physical LU 331 from the virtual LU 332 for the active server 200 to the virtual LU 332 for the standby server 200 at an arbitrary timing. This allows appropriate distribution of the I/O load.

As described above, according to the embodiments of this invention, the server 200 coupled to the port 305 different from the port 305 coupled to the active server 200 can be selected as the standby server 200. This allows the distribution of the I/O load.

Further, the standby server 200 does not need a setting on which the information on the active server 200 is reflected in advance, which facilitates the management of the computer system.

It should be noted that software configuration described above in this invention may be decomposed into a plurality of modules or may be combined into one module. For example, the switching processing part 110 may have functions provided to the server searching part 120, the server configuration verification part 130, and the LU management part 140.

It should be noted that a part or all of the component, processing parts, processing means, and the like of the computer and the like described above in this invention may be implemented by dedicated hardware. Further, various kinds of software exemplified above in the embodiments of this invention can be stored in various recording media (for example, non-transitory storage media) that are electromagnetic, electronic, optical, and the like, and can be downloaded onto the computer through a communication network such as the Internet.

Further, this invention is not limited to the above-mentioned embodiments, and includes various modification examples. For example, an embodiment combining the first to third embodiments of this invention may be applied thereto.

What is claimed is:

1. A computer switching method to be performed by a computer system including a plurality of computers, a storage system, and a management computer, the plurality of computers each including: a first processor; a first memory coupled to the first processor; and a first I/O device coupled to the first processor, the management computer including: a second processor; a second memory coupled to the second processor; and a second I/O device coupled to the second processor, the storage system including: a controller; a plurality of storage devices coupled to the controller; and a plurality of ports coupled to the controller, for respectively coupling the storage system to the plurality of computers, the plurality of computers including: a plurality of first computers for executing a service; and a plurality of second computers for taking over the service executed by each of the plurality of first computers, the storage system providing a logical storage device generated by using storage areas of the plurality of storage devices to each of the plurality of first computers, the logical storage device including a first logical storage device which is a storage area for storing data necessary for the service, the computer switching method comprising:

a first step of detecting, by the management computer, a switch trigger for the service from one of the plurality of first computers to one of the plurality of second computers;

a second step of transmitting, by the management computer, a first generation request for instructing the storage system to generate a second logical storage device which is a virtualized storage area to be provided to the one of the plurality of second computers;

a third step of generating, by the storage system, the second logical storage device for the one of the plurality of second computers based on the first generation request;

a fourth step of generating, by the management computer, first change information for mapping the first logical storage device for storing the data necessary for the service executed by the one of the plurality of first computers to the second logical storage device for the one of the plurality of second computers, and transmitting a first change request including the generated first change information to the storage system;

a fifth step of mapping, by the storage system, the first logical storage device for storing the data necessary for the service executed by the one of the plurality of first computers to the second logical storage device for the one of the plurality of second computers based on the first change information;

a sixth step of booting, by the management computer, the one of the plurality of second computers, wherein the storage system stores mapping management information for managing a mapping relationship between the first logical storage device and the second logical storage device, wherein the management computer stores:

path information for managing a coupling path between each of the plurality of computers and the storage system; and storage device management information for managing the logical storage device to be provided to the each of the plurality of first computers;

wherein the computer switching method further comprises:

a seventh step of referring, by the management computer, to the path information and the storage device management information after detecting the switch trigger, to identify the logical storage device to be provided to the one of the plurality of first computers;

an eighth step of determining, by the management computer, whether the identified logical storage device is the first logical storage device;

a ninth step of transmitting, by the management computer, a second generation request for instructing the storage system to generate the second logical storage device for the one of the plurality of first computers, in a case where it is determined that the identified logical storage device is the first logical storage device;

a tenth step of generating, by the storage system, the second logical storage device for the one of the plurality of first computers based on the second generation request;

an eleventh step of generating, by the management computer, second change information for mapping the identified first logical storage device to the second logical storage device for the one of the plurality of first computers, and transmitting a second change request including the generated second change information to the storage system;

a twelfth step of mapping, by the storage system, the identified first logical storage device to the second logical storage device for the one of the plurality of first computers based on the second change information; and the fourth step includes generating the first change information for changing a mapping destination of the first logical storage device for storing the data necessary for the service executed by the one of the plurality of first computers from the second logical storage device for the one of the plurality of first computers to the second logical storage device for the one of the plurality of second computers.

2. The computer switching method according to claim 1, wherein:

the second step includes:

referring to the storage device management information to identify a capacity of the logical storage device to be provided to the one of the plurality of first computers; and transmitting the first generation request including the capacity of the logical storage device to be provided to the one of the plurality of first computers; and the ninth step includes:

referring to the storage device management information to identify a capacity of the first logical device to be provided to the one of the plurality of first computers; and transmitting the second generation request including the capacity of the first logical storage device to be provided to the one of the plurality of first computers.

3. The computer switching method according claim 1, wherein:

the fifth step includes assigning identification information assigned to the logical storage device to be provided to the one of the plurality of first computers to the second logical storage device for the one of the plurality of second computers; and the twelfth step includes assigning identification information assigned to the first logical storage device to be provided to the one of the plurality of first computers to the second logical storage device for the one of the plurality of first computers.

4. The computer switching method according to claim 1, further including:
a thirteenth step of identifying, by the management computer, the logical storage device to be provided to the one of the plurality of first computers, in a case where an instruction to register a group including at least one of the plurality of first computers and at least one of the plurality of second computers is received;
a fourteenth step of determining, by the management computer, whether the identified logical storage device is the first logical storage device;
a fifteenth step of transmitting, by the management computer, a third generation request for instructing the storage system to generate the second logical storage device for the one of the plurality of first computers, in a case where it is determined that the identified logical storage device is the first logical storage device;
a sixteenth step of generating, by the storage system, the second logical storage device for the one of the plurality of first computers based on the third generation request;
a seventeenth step of generating, by the management computer, third change information for mapping the identified first logical storage device to the second logical storage device for the one of the plurality of first computers, and transmitting a third change request including the generated third change information to the storage system;
an eighteenth step of mapping, by the storage system, the identified first logical storage device to the second logical storage device for the one of the plurality of first computers based on the third change information;
a nineteenth step of transmitting, by the management computer, a fourth generation request for instructing the storage system to generate the second logical storage device for the one of the plurality of second computers; and
a twentieth step of generating, by the storage system, the second logical storage device for the one of the plurality of second computers based on the fourth generation request.

5. The computer switching method according to claim 4, wherein:
the nineteenth step includes:
calculating, by the management computer, a maximum number of logical storage devices to be provided to the at least one of the plurality of first computers included in the group and a maximum capacity thereof based on the storage device management information; and
transmitting, by the management computer, the fourth generation request including the calculated maximum number of logical storage devices to be provided to the at least one of the plurality of first computers included in the group and the calculated maximum capacity of the logical storage device; and
the twentieth step includes generating, by the storage system, as many second logical storage devices, which have the same capacity as the maximum capacity of the logical storage device to be provided to the at least one of the plurality of first computers included in the group, as the maximum number of logical storage devices to be provided to the at least one of the plurality of first computers included in the group.

6. A computer system, comprising:
a plurality of computers;
a storage system; and
a management computer,
the plurality of computers each including:
a first processor;
a first memory coupled to the first processor; and
a first I/O device coupled to the first processor,
the management computer including:
a second processor;
a second memory coupled to the second processor; and
a second I/O device coupled to the second processor,
the storage system including:
a controller;
a plurality of storage devices coupled to the controller; and
a plurality of ports coupled to the controller, for respectively coupling the storage system to the plurality of computers,
the plurality of computers including: a plurality of first computers for executing a service; and a plurality of second computers for taking over the service executed by each of the plurality of first computers,
the storage system providing a logical storage device generated by using storage areas of the plurality of storage devices to each of the plurality of first computers,
the logical storage device including a first logical storage device which is a storage area for storing data necessary for the service,
the computer system further including:
a switching processing part for switching one of the plurality of computers for executing the service from one of the plurality of first computers to one of the plurality of second computers; and
a mapping processing part for managing a mapping relationship between the first logical storage device and a second logical storage device, wherein:
the switching processing part is configured to:
detect a switch trigger for the service from one of the plurality of first computers to one of the plurality of second computers;
transmit a first generation request for instructing the mapping processing part to generate the second logical storage device which is a virtualized storage area to be provided to the one of the plurality of second computers;
generate first change information for mapping the first logical storage device for storing the data necessary for the service executed by the one of the plurality of first computers to the second logical storage device for the one of the plurality of second computers;
transmit a first change request including the generated first change information to the mapping processing part; and
boot the one of the plurality of second computers after the first logical storage device for storing the data necessary for the service executed by the one of the plurality of first computers is mapped to the second logical storage device for the one of the plurality of second computers; and
the mapping processing part is configured to:
generate the second logical storage device for the one of the plurality of second computers based on the first generation request;
map the first logical storage device for storing the data necessary for the service executed by the one of the plurality of first computers to the second logical storage device for the one of the plurality of second computers based on the first change information, wherein the mapping processing part stores mapping management information for managing a mapping relationship between the first logical storage device and the second logical storage device;

wherein the switching processing part stores:

path information for managing a coupling path between each of the plurality of computers and the storage system; and storage device management information for managing the logical storage device to be provided to the each of the plurality of first computers;

wherein the switching processing part is further configured to:

refer to the path information and the storage device management information after detecting the switch trigger, to identify the logical storage device to be provided to the one of the plurality of first computers;

determine whether the identified logical storage device is the first logical storage device;

transmit a second generation request for instructing the mapping processing part to generate the second logical storage device for the one of the plurality of first computers, in a case where it is determined that the identified logical storage device is the first logical storage device;

generate second change information for mapping the identified first logical storage device to the second logical storage device for the one of the plurality of first computers; and transmit a second change request including the generated second change information to the mapping processing Part;

the mapping processing part is further configured to:

generate the second logical storage device for the one of the plurality of first computers based on the second generation request; and map the identified first logical storage device to the second logical storage device for the one of the plurality of first computers based on the second change information, wherein the first change request includes information for changing a mapping destination of the first logical storage device for storing the data necessary for the service executed by the one of the plurality of first computers from the second logical storage device for the one of the plurality of first computers to the second logical storage device for the one of the plurality of second computers.

7. The computer system according to claim 6, wherein the switching processing part is further configured to:

transmit the first generation request including a capacity of the logical storage device to be provided to the one of the plurality of first computers which is identified by referring to the storage device management information; and transmit the second generation request including a capacity of the first logical device to be provided to the one of the plurality of first computers which is identified by referring to the storage device management information.

8. The computer system according to claim 6, wherein the mapping processing part is further configured to:

assign identification information assigned to the logical storage device to be provided to the one of the plurality of first computers to the second logical storage device for the one of the plurality of second computers, in a case where the first change request is received; and assign identification information assigned to the first logical storage device to be provided to the one of the plurality of first computers to the second logical storage device for the one of the plurality of first computers, in a case where the second change request is received.

9. The computer system according to claim 6, wherein:

the switching processing part is further configured to:

identify the logical storage device to be provided to the one of the plurality of first computers, in a case where an instruction to register a group including at least one of the plurality of first computers and at least one of the plurality of second computers is received;

determine whether the identified logical storage device is the first logical storage device;

transmit a third generation request for instructing the mapping processing part to generate the second logical storage device for the one of the plurality of first computers, in a case where it is determined that the identified logical storage device is the first logical storage device;

generate third change information for mapping the identified first logical storage device to the second logical storage device for the one of the plurality of first computers;

transmit the generated third change information to the mapping processing part; and transmit a fourth generation request for instructing the mapping processing part to generate the second logical storage device for the one of the plurality of second computers; and the mapping processing part is further configured to:

generate the second logical storage device for the one of the plurality of first computers based on the third generation request;

map the identified first logical storage device to the second logical storage device for the one of the plurality of first computers based on the third change information; and generate the second logical storage device for the one of the plurality of second computers based on the fourth generation request.

10. The computer system according to claim 9, wherein:

the switching processing part is further configured to:

calculate, in a case of transmitting the fourth generation request, a maximum number of the logical storage devices to be provided to the at least one of the plurality of first computers included in the group and a maximum capacity thereof based on the storage device management information; and transmit the fourth generation request including the calculated maximum number of logical storage devices to be provided to the at least one of the plurality of first computers included in the group and the calculated maximum capacity of the logical storage device; and the mapping processing part is further configured to generate as many second logical storage devices, which have the same capacity as the maximum capacity of the logical storage device to be provided to the at least one of the plurality of first computers included in the group, as the maximum number of logical storage devices to be provided to the at least one of the plurality of first computers included in the group.

11. A management computer for controlling switching processing for a plurality of computers to be coupled to a storage system, the management computer comprising:

a processor;

a memory coupled to the processor; and an I/O device coupled to the processor, the plurality of computers including: a plurality of first computers for executing a service; and a plurality of second computers for taking over the service executed by each of the plurality of first computers, the storage system providing a logical storage device generated by using storage areas of the plurality of storage devices to each of the plurality of first computers, the logical storage device including a first logical storage device which is a storage area for storing data necessary for the service, wherein the management computer is configured to:

detect a switch trigger for the service from the plurality of first computers to the plurality of second computers;

transmit a first generation request for instructing the storage system to generate a second logical storage device which is a virtualized storage area to be provided to the one of the plurality of second computers;

generate first change information for mapping the first logical storage device for storing the data necessary for the service executed by the one of the plurality of first computers to the second logical storage device for the one of the plurality of second computers, and transmit a first change request including the generated first change information to the storage system; and boot the one of the plurality of second computers, wherein the management computer stores:

path information for managing a coupling path between each of the plurality of computers and the storage system; and storage device management information for managing the logical storage device to be provided to the each of the plurality of first computers, wherein the management computer is further configured to:

refer to the path information and the storage device management information after detecting the switch trigger, to identify the logical storage device to be provided to the one of the plurality of first computers;

determine whether the identified logical storage device is the first logical storage device;

transmit a second generation request for instructing the storage system to generate the second logical storage device for the one of the plurality of first computers, in a case where it is determined that the identified logical storage device is the first logical storage device;

generate second change information for mapping the identified first logical storage device to the second logical storage device for the one of the plurality of first computers; and transmit a second change request including the generated second change information to the storage system, and wherein the first change request includes information for changing a mapping destination of the first logical storage device for storing the data necessary for the service executed by the one of the plurality of first computers from the second logical storage device for the one of the plurality of first computers to the second logical storage device for the one of the plurality of second computers.

12. The management computer according to claim 11, wherein the management computer is further configured to:

transmit the first generation request including a capacity of the logical storage device to be provided to the one of the plurality of first computers which is identified by referring to the storage device management information; and transmit the second generation request including a capacity of the first logical device to be provided to the one of the plurality of first computers which is identified by referring to the storage device management information.

* * * * *